(12) United States Patent
Taki et al.

(10) Patent No.: US 12,033,630 B2
(45) Date of Patent: Jul. 9, 2024

(54) INFORMATION PROCESSING DEVICE, INFORMATION PROCESSING METHOD, AND PROGRAM

(71) Applicant: Sony Group Corporation, Tokyo (JP)

(72) Inventors: Yuhei Taki, Tokyo (JP); Hiro Iwase, Tokyo (JP); Kunihito Sawai, Tokyo (JP); Masaki Takase, Tokyo (JP); Akira Miyashita, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 379 days.

(21) Appl. No.: 17/613,088

(22) PCT Filed: Mar. 2, 2020

(86) PCT No.: PCT/JP2020/008611
§ 371 (c)(1),
(2) Date: Nov. 22, 2021

(87) PCT Pub. No.: WO2020/240958
PCT Pub. Date: Dec. 3, 2020

(65) Prior Publication Data
US 2022/0238108 A1    Jul. 28, 2022

(30) Foreign Application Priority Data
May 30, 2019    (JP) ................. 2019-101736

(51) Int. Cl.
*G10L 15/22*    (2006.01)
(52) U.S. Cl.
CPC ........ *G10L 15/22* (2013.01); *G10L 2015/223* (2013.01)

(58) Field of Classification Search
CPC .......................... G10L 15/22; G10L 2015/223
(Continued)

(56) References Cited

U.S. PATENT DOCUMENTS 7,904,297 B2 *  3/2011  Mirkovic ............... G10L 15/26
                                                704/235
9,361,883 B2 *  6/2016  Paek .................... G10L 15/26
(Continued)

FOREIGN PATENT DOCUMENTS

JP    6-223104 A    8/1994
JP    2015-52745 A  3/2015
(Continued)

OTHER PUBLICATIONS

International Search Report and Written Opinion mailed on Jun. 2, 2020, received for PCT Application PCT/JP2020/008611, Filed on Mar. 2, 2020, 10 pages including English Translation.

*Primary Examiner* — Susan I McFadden
(74) *Attorney, Agent, or Firm* — XSENSUS LLP

(57) ABSTRACT

An information processing device includes an input unit, an extracting unit, an output unit, and a specifying unit. The input unit receives a voice operation. The extracting unit extracts a processing detail corresponding to the voice operation received by the input unit. When the processing detail corresponding to the voice operation received by the input unit cannot be specified, the output unit outputs response information for the user to make a selection of at least one processing detail from a plurality of processing details extracted by the extracting unit. The specifying unit specifies the processing detail selected from among the plurality of processing details contained in the response information as the processing detail corresponding to the voice operation received by the input unit.

16 Claims, 13 Drawing Sheets

(58) Field of Classification Search
USPC .......................................................... 704/275
See application file for complete search history.

(56) References Cited

U.S. PATENT DOCUMENTS

| | | | |
|---|---|---|---|
| 10,209,954 B2 * | 2/2019 | Sullivan | .................. G06F 3/167 |
| 10,868,720 B2 * | 12/2020 | Shaikh | ................ H04L 41/0823 |
| 11,232,504 B2 * | 1/2022 | Gormley | ............. B60W 30/182 |
| 2015/0379568 A1 | 12/2015 | Balasubramanian et al. | |

FOREIGN PATENT DOCUMENTS

| | | |
|---|---|---|
| WO | 2014/103568 A1 | 7/2014 |
| WO | 2016/002406 A1 | 1/2016 |
| WO | 2016/157650 A1 | 10/2016 |
| WO | 2019/017027 A1 | 1/2019 |

* cited by examiner

FIG.14

| PROCESSING DETAIL | PROCESSING CATEGORY | WEIGHT |
|---|---|---|
| ■NORMAL PLAYBACK | PLAYBACK | 10 |
| ■DIGEST PLAYBACK | DIGEST | 5 |
| ■PLAYBACK OF BEGINNING FOR ONE MINUTE | DIGEST | 4 |
| ■THUMBNAIL DISPLAY | VIDEO INFORMATION | 2 |
| ■CONTENT INFORMATION DISPLAY | VIDEO INFORMATION | 2 |
| ■USER REVIEW DISPLAY | VIDEO INFORMATION | 2 |

INFORMATION PROCESSING DEVICE, INFORMATION PROCESSING METHOD, AND PROGRAM

CROSS-REFERENCE TO RELATED APPLICATIONS

The present application is based on PCT filing PCT/JP2020/008611, filed Mar. 2, 2020, which claims priority to JP 2019-101736, filed May 30, 2019, the entire contents of each are incorporated herein by reference.

FIELD

The present disclosure relates to an information processing device, an information processing method, and a program.

BACKGROUND

Information processing devices operated by voice such as smart speakers and smartphones are known.

CITATION LIST

Patent Literature

Patent Literature 1: JP H06-223104 A

SUMMARY

Technical Problem

In the above-described related art, a technique for analyzing utterances issued by users has been disclosed.

However, when a user utters an ambiguous voice that is too abstract, such an information processing device cannot execute processing as expected by the user even with analysis of the utterance because the utterance is ambiguous.

The present disclosure therefore proposes an information processing device, an information processing method, and a program that make processing of interest indicated by an ambiguous voice operation specifiable.

Solution to Problem

To solve the problems described above, an information processing device according to an embodiment of the present disclosure includes an input unit, an extracting unit, an output unit, and a specifying unit. The input unit receives a voice operation. The extracting unit extracts a processing detail corresponding to the voice operation received by the input unit. When the processing detail corresponding to the voice operation received by the input unit cannot be specified, the output unit outputs response information for making selection of at least one processing detail from a plurality of the processing details extracted by the extracting unit. The specifying unit specifies the processing detail selected from the plurality of processing details contained in the response information as the processing detail corresponding to the voice operation received by the input unit.

BRIEF DESCRIPTION OF DRAWINGS

FIG. 14 is a diagram illustrating an example of a data structure of data extracted by a processing detail inferring unit according to the second embodiment of the present disclosure.

DESCRIPTION OF EMBODIMENTS

Figure 1:
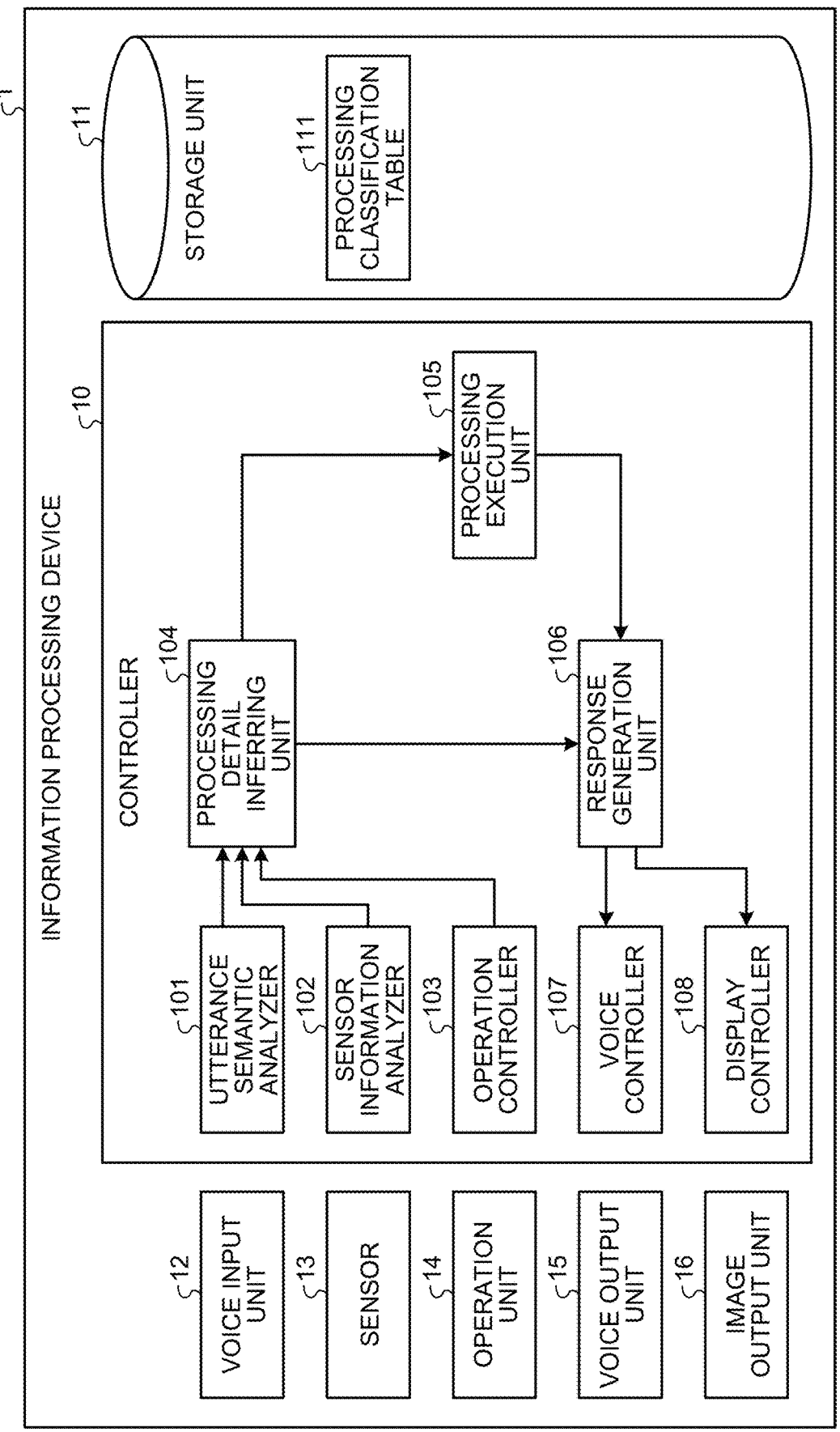
FIG. 1 is a diagram illustrating an example of a structure of an information processing device according to a first embodiment of the present disclosure.

Hereinafter, embodiments of the present disclosure will be described in detail with reference to the drawings. Note that, in each of the following embodiments, the same components are denoted by the same reference numerals to avoid the description from being redundant.

For example, an information processing device such as a smartphone or a smart speaker receives a voice operation that is an operation by voice. For the voice operation, the user operates the information processing device by any desired utterance. When the user's utterance is too abstract to provide a clear understanding, the information processing device cannot execute processing as expected by the user. For example, when the user says, "play the animation A", the user's utterance has no content specifying either the playback of the music of the animation A or the playback of the video of the animation A. This may make the information processing device unable to execute processing as expected by the user.

Further, the information processing device may have a function, called a macro, a routine, or a command, that associate a specific utterance with specific processing. Such a function is designed to register, for example, an association between an utterance of "tomorrow's weather" and tomorrow's weather for a specific region and output tomorrow's weather for the specific region in response to the user's utterance of "tomorrow's weather".

Here, it is assumed that the wording "tomorrow's weather" originally means tomorrow's weather across the country. In this case, when the wording "tomorrow's weather" and a request to output tomorrow's weather for the specific region are registered in association with each other, "tomorrow's weather" has two meanings: the request to output tomorrow's weather for the specific region and a request to output tomorrow's weather across the country. This may make the information processing device unable to execute processing as expected by the user.

A description will be given below of an information processing device, an information processing method, and a program that make processing of interest indicated by an ambiguous voice operation specifiable according to the following embodiments.

First Embodiment

Structure of Information Processing Device 1 According to First Embodiment

FIG. 1 is a diagram illustrating an example of a structure of an information processing device 1 according to the first embodiment. The information processing device 1 includes a controller 10, a storage unit 11, a voice input unit 12, a sensor 13, an operation unit 14, a voice output unit 15, and an image output unit 16.

The controller 10 controls the information processing device 1 in a centralized manner. For example, the controller 10 is implemented by a processor such as a central processing unit (CPU) or a micro processing unit (MPU). For example, the controller 10 performs various functions by executing various programs stored in the storage unit 11 or the like using a random access memory (RAM) or the like as a work area. Note that the controller 10 may be implemented by an integrated circuit such as an application specific integrated circuit (ASIC) or a field programmable gate array (FPGA).

The storage unit 11 is implemented by, for example, a semiconductor memory element such as a random access memory (RAM) or a flash memory, or a storage such as a hard disk or an optical disc. The storage unit 11 stores, for example, a processing classification table 111.

Figure 2:
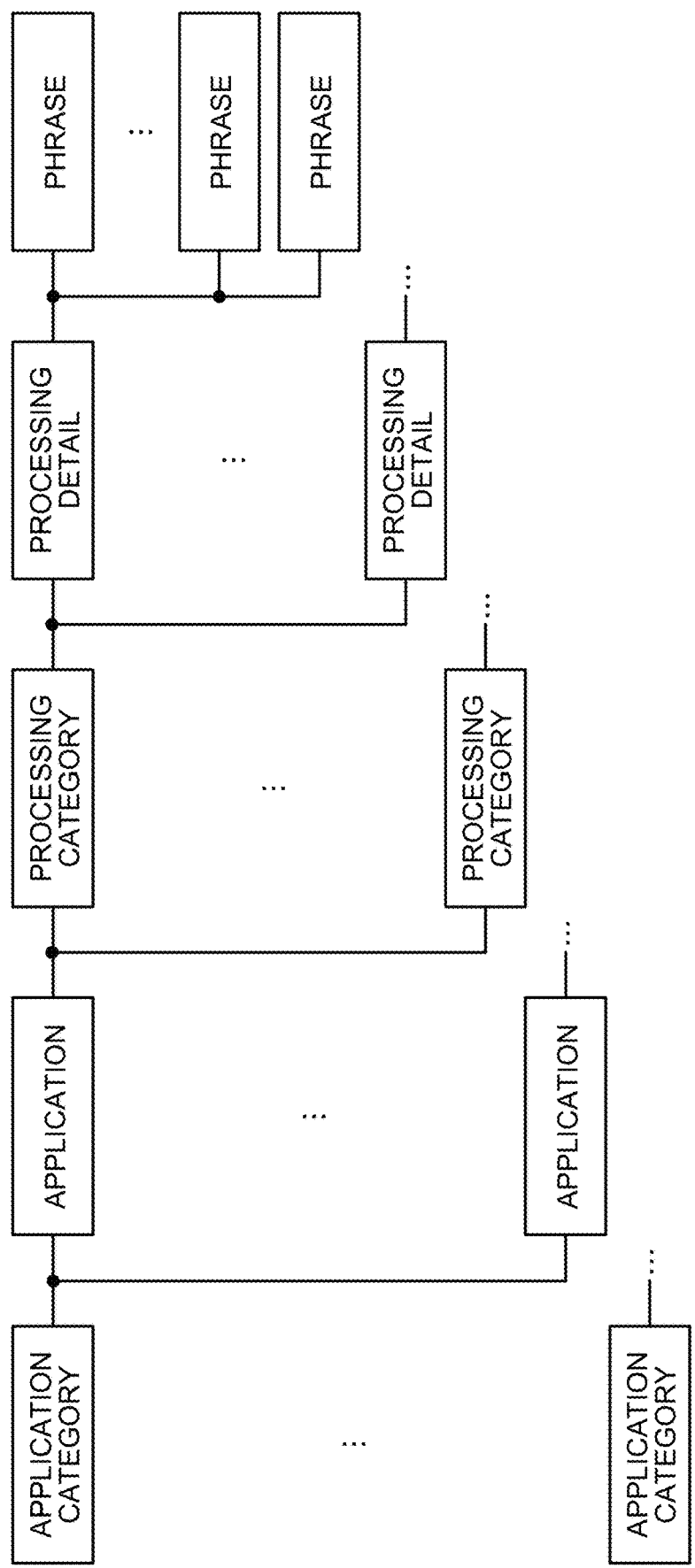
FIG. 2 is a diagram illustrating an example of a data structure of a processing classification table according to the first embodiment of the present disclosure.

FIG. 2 is a diagram illustrating an example of a data structure of the processing classification table 111 according to the first embodiment. The processing classification table 111 is a table where processing to be executed by the information processing device 1 is classified into categories. As illustrated in FIG. 2, an application category indicating a category of an application included in the information processing device 1 is associated with an application belonging to the application category. Further, each application is associated with a processing category indicating a category of corresponding processing to be executed by the application. Further, each processing category is associated with a processing detail belonging to the processing category. Further, each processing detail may have a single-level hierarchy or multiple-level hierarchy. Each processing detail is associated with one or more phrases. Each phrase corresponds to wording representing a processing detail associated with the phrase.

The voice input unit 12 is, for example, a microphone that collects the sound of a voice uttered by the user.

The sensor 13 is, for example, a camera that captures an action of the user or a line of sight of the user as an image.

The operation unit 14 is a device for use in receiving various operations from the user. For example, the operation unit 14 is implemented by a button, a touchscreen, or the like.

The voice output unit 15 is, for example, a speaker that outputs voice data.

The image output unit 16 is, for example, a display that outputs image data.

As illustrated in FIG. 2, the controller 10 includes, as functional modules, an utterance semantic analyzer 101, a sensor information analyzer 102, an operation controller 103, a processing detail inferring unit 104, a processing execution unit 105, a response generation unit 106, a voice controller 107, and a display controller 108.

The utterance semantic analyzer 101 is an example of an input unit. The utterance semantic analyzer 101 receives the sound of a voice collected by the voice input unit 12. For example, the utterance semantic analyzer 101 receives a voice operation. Then, the utterance semantic analyzer 101 analyzes the meaning of utterances contained in the voice operation issued by the user.

The sensor information analyzer 102 analyzes information obtained by the sensor 13. For example, the sensor information analyzer 102 receives an operation by detecting an action of the user or a line of sight of the user from the information such as an image obtained by the sensor 13. For example, the sensor information analyzer 102 receives an operation of selecting at least one processing detail from a plurality of processing details.

The operation controller 103 controls the operation unit 14 to receive various operations. For example, the operation controller 103 receives an operation of selecting at least one processing detail from a plurality of processing details.

The processing detail inferring unit 104 is an example of an extracting unit and an example of a specifying unit. The processing detail inferring unit 104 infers a processing detail corresponding to the voice operation received by the utterance semantic analyzer 101. More specifically, the processing detail inferring unit 104 extracts a processing detail corresponding to the voice operation from the processing classification table 111 based on the result of the analysis of the voice operation made by the utterance semantic analyzer 101. When only one processing detail is extracted from the processing classification table 111, the processing detail inferring unit 104 specifies the processing detail thus extracted as the processing detail corresponding to the voice operation received by the utterance semantic analyzer 101. On the other hand, when a plurality of processing details are extracted from the processing classification table 111, the processing detail inferring unit 104 determines that the processing detail corresponding to the voice operation received by the utterance semantic analyzer 101 cannot be specified.

Further, the processing detail inferring unit 104 specifies a processing detail selected from a plurality of processing details contained in response information generated by the response generation unit 106 to be described later as the processing detail corresponding to the voice operation received by the utterance semantic analyzer 101. More specifically, the processing detail inferring unit 104 specifies the processing detail corresponding to the voice operation received by the utterance semantic analyzer 101, selected from the plurality of processing details contained in the response information, based on the operation received by the utterance semantic analyzer 101, the sensor information analyzer 102, or the operation controller 103.

The processing execution unit 105 executes the processing detail corresponding to the voice operation received by the utterance semantic analyzer 101.

The response generation unit 106 generates the response information when the processing detail corresponding to the voice operation received by the utterance semantic analyzer 101 cannot be specified. The response information is used for narrowing down a plurality of processing details extracted by the processing detail inferring unit 104. That is, the response information is used for making selection of at least one processing detail from a plurality of processing details extracted by the processing detail inferring unit 104.

The voice controller 107 and the display controller 108 are examples of an output unit. The voice controller 107 controls the voice output unit 15 to output the response information. For example, the voice controller 107 outputs voice information contained in the response information.

The display controller 108 controls the image output unit 16 to output the response information. For example, the display controller 108 outputs image information contained in the response information. Further, when the processing detail corresponding to the voice operation received by the processing detail inferring unit 104 cannot be specified, the voice controller 107 or the display controller 108 outputs the response information for making selection of at least one processing detail from the plurality of processing details extracted by the processing detail inferring unit 104.

First Processing Example According to First Embodiment

A description will be given below of specific examples of various types of processing with reference to FIGS. 3 to 11. As illustrated in FIGS. 3 to 11, the information processing device 1 specifies, based on various types of information, the processing detail corresponding to the voice operation issued by the user.

Figure 3:
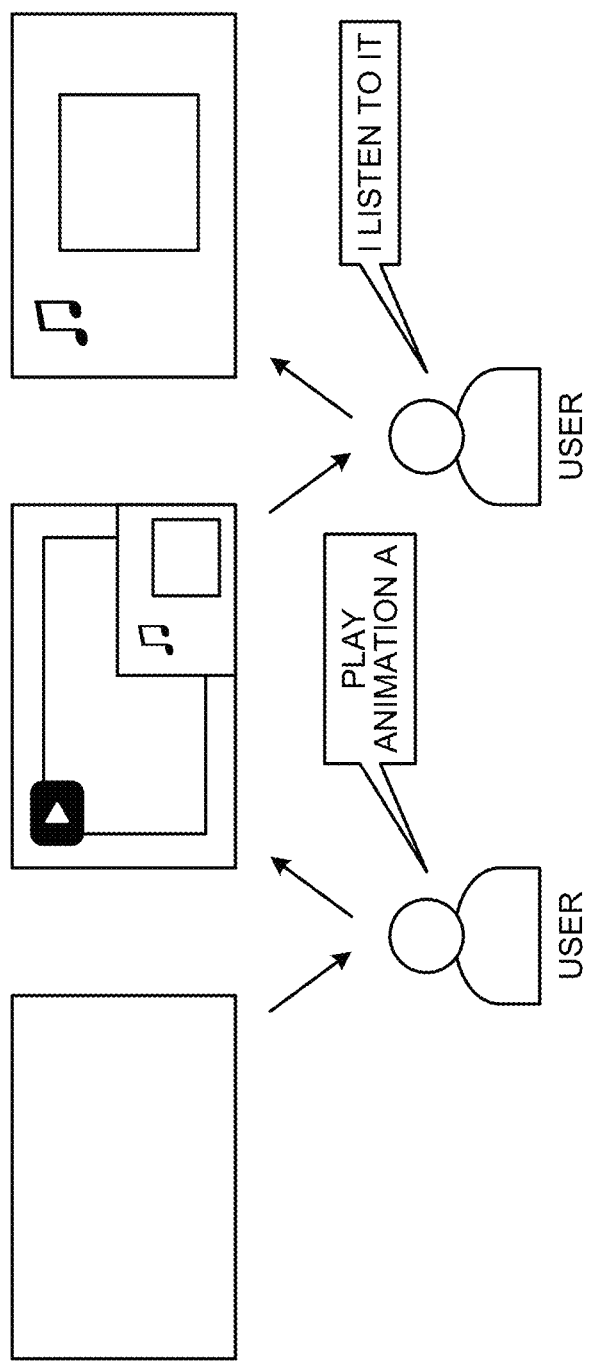
FIG. 3 is a diagram illustrating an example of a flow of processing executed by the information processing device according to the first embodiment of the present disclosure.

FIG. 3 is a diagram illustrating an example of a flow of processing executed by the information processing device 1 according to the first embodiment. The image output unit 16 displays an input screen that receives a voice operation. The user says, "play the animation A". In other words, the utterance semantic analyzer 101 receives a voice operation corresponding to a plurality of processing details associated with "play the animation A".

The processing detail inferring unit 104 extracts the plurality of processing details corresponding to the voice operation issued by the user. Here, the user says, "play the animation A", but the user's utterance has no content specifying either the playback of the video of the animation A or the playback of the music of the animation A. Therefore, the processing detail inferring unit 104 extracts, as processing details, processing of playing a video and processing of playing music from the processing classification table 111.

The response generation unit 106 generates response information containing screen information including a video playback image where a video is played and a music playback image where music is played as the operation detail corresponding to the voice operation. The display controller 108 outputs the response information containing the screen information for making selection of the processing detail from the plurality of processing details extracted by the processing detail inferring unit 104. That is, the display controller 108 causes the image output unit 16 to display the screen information contained in the response information. Further, when the response information contains the voice information, the voice controller 107 causes the voice output unit 15 to output the sound of a corresponding voice.

In response to the output of the response information, the user says, "I listen to it". The utterance semantic analyzer 101 receives a voice operation of "I listen to it". In general, the wording "I listen to it" is uttered when listening to music. Therefore, the processing detail inferring unit 104 specifies, as the processing detail corresponding to the voice operation received by the utterance semantic analyzer 101, the processing of playing music from the processing of playing a video and the processing of playing music. In other words, the processing detail inferring unit 104 specifies, as the processing detail corresponding to the voice operation received by the utterance semantic analyzer 101, the processing of playing a video from the processing of playing a video and the processing of playing music contained in the response information.

Then, the processing execution unit 105 executes the processing of playing the music of the animation A. The display controller 108 causes the image output unit 16 to output a playback screen of the music of the animation A. Further, the voice controller 107 causes the voice output unit 15 to output the music of the animation A.

As described above, according to the first processing example, the information processing device 1 can specify processing of interest indicated by an ambiguous voice operation by causing the processing detail to be selected from choices of the processing details corresponding to the voice operation.

Second Processing Example According to First Embodiment

Figure 4:
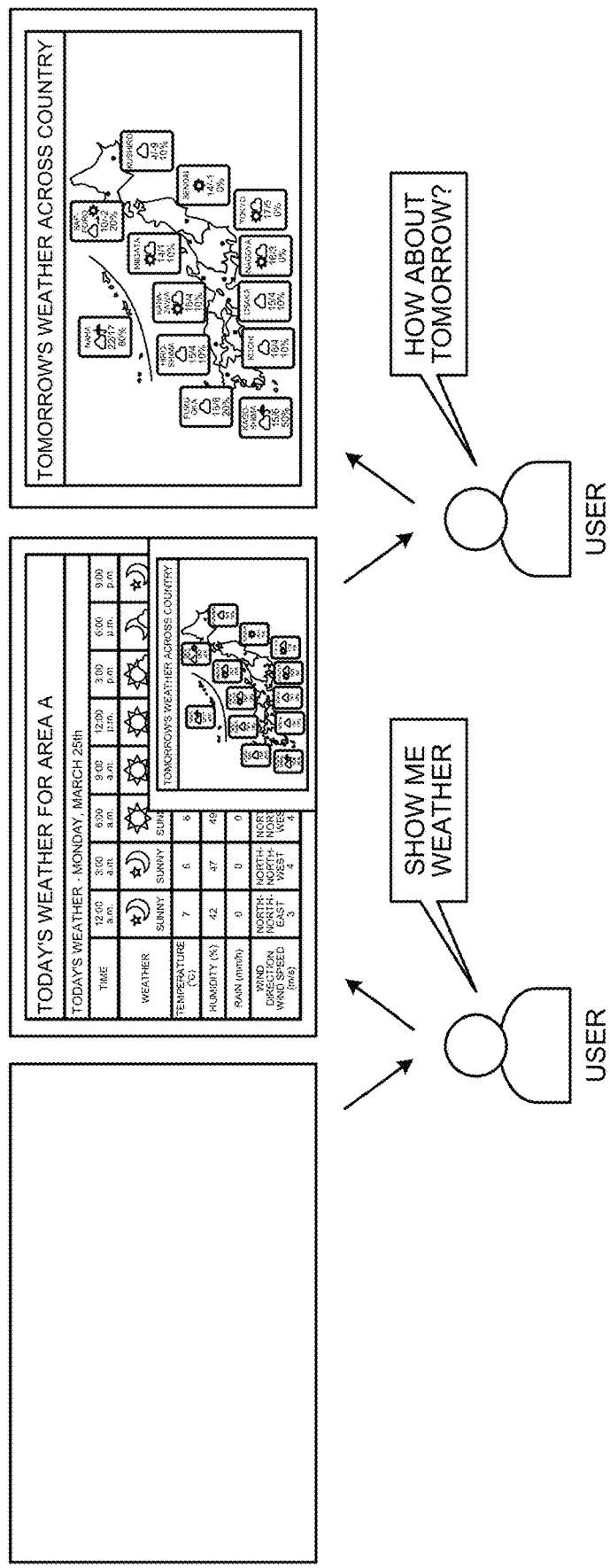
FIG. 4 is a diagram illustrating an example of the flow of processing executed by the information processing device according to the first embodiment of the present disclosure.

FIG. 4 is a diagram illustrating an example of the flow of processing executed by the information processing device 1 according to the first embodiment. In FIG. 4, the wording "show me the weather" is registered as a macro corresponding to processing of displaying today's weather for the area A. On the other hand, in an initial state where no macro is registered, it is assumed that the wording "show me the weather" indicates the display of tomorrow's weather across the country.

The image output unit 16 displays an input screen that receives a voice operation. The utterance semantic analyzer 101 receives the user's utterance of "show me the weather". The utterance semantic analyzer 101 receives a voice operation indicating specific wording associated with a specific processing detail. In other words, the utterance semantic analyzer 101 receives a voice operation of "play the animation A".

The processing detail inferring unit 104 extracts a processing detail associated with the wording and a processing detail inferred from the meaning of the wording in the initial state where the wording is not associated with the processing detail. Here, the user says, "show me the weather", but the user's utterance has no content specifying either the operation registered as a macro or the operation in the initial state. Therefore, the processing detail inferring unit 104 of the information processing device 1 extracts, as processing details, processing of displaying today's weather for the area A registered as a macro and processing of displaying tomorrow's weather across the country in the initial state from the processing classification table 111.

The response generation unit 106 generates response information containing screen information including an image representing the result of the processing of displaying today's weather for the area A and an image representing the result of the processing of displaying tomorrow's weather across the country. The display controller 108 outputs the response information for making selection of the processing detail from the processing detail associated with the wording indicated by the voice operation and the processing detail inferred from the meaning of the wording in the initial state where the voice operation is not associated with the processing detail. For example, the display controller 108 causes the image output unit 16 to display, side by side, the image representing the result of the processing of displaying today's weather for the area A and the image representing the result of the processing of displaying tomorrow's weather across the country. At this time, when the response information contains voice information, the voice controller 107 causes the voice output unit 15 to output the sound of a corresponding voice.

In response to the output of the response information, the user says, "how about tomorrow?". The utterance semantic analyzer 101 of the information processing device 1 receives a voice operation of "how about tomorrow?". The processing detail inferring unit 104 specifies, as the processing detail corresponding to the voice operation received by the utterance semantic analyzer 101, the processing of displaying tomorrow's weather across the country from the processing of displaying today's weather for the area A and the processing of displaying tomorrow's weather across the country. Then, the processing execution unit 105 executes the processing of displaying tomorrow's weather across the country. The display controller 108 causes the image output unit 16 to output the screen of tomorrow's weather across the country.

An example where the image of today's weather for the area A and the image of tomorrow's weather across the country are displayed side by side has been described with reference to FIG. 4. Note that the display controller 108 may alternately display the image of today's weather for the area A and the image of tomorrow's weather across the country.

Figure 5:
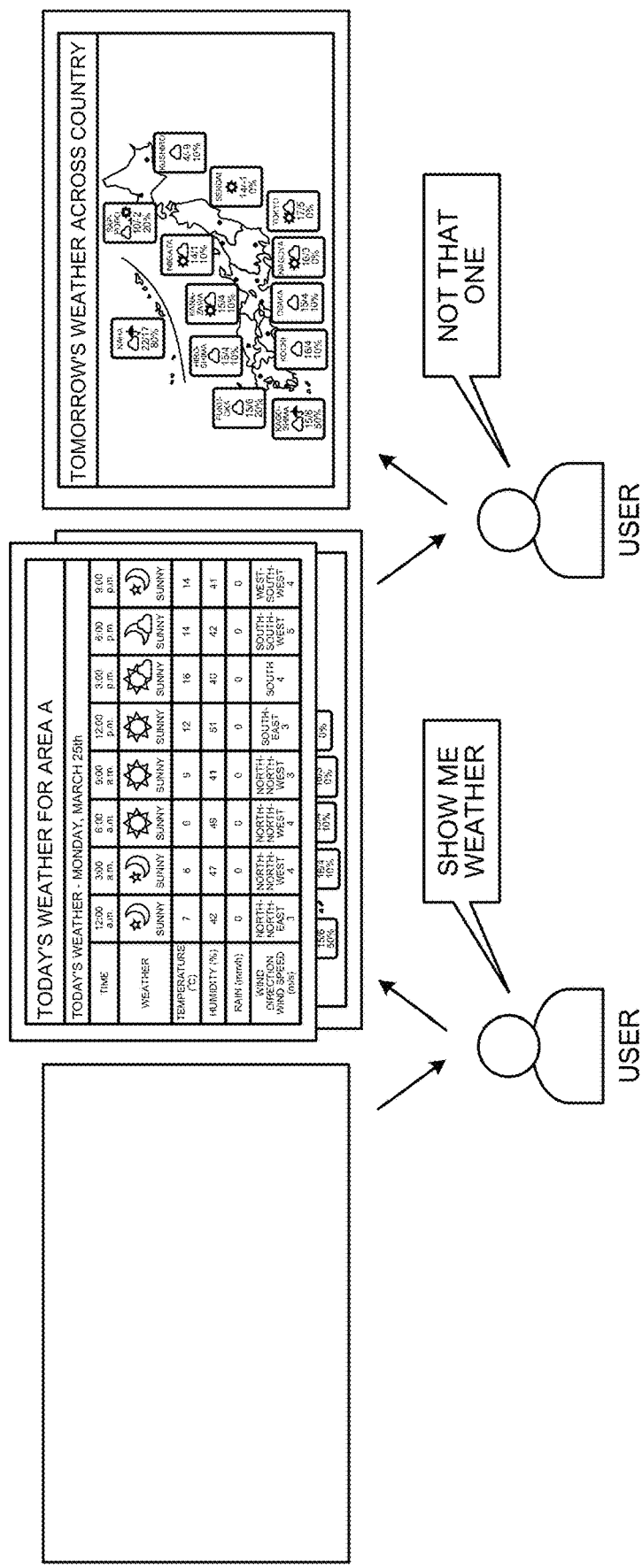
FIG. 5 is a diagram illustrating an example of the flow of processing executed by the information processing device according to the first embodiment of the present disclosure.

FIG. 5 is a diagram illustrating an example of the flow of processing executed by the information processing device 1 according to the first embodiment. As illustrated in FIG. 5, the display controller 108 may alternately display the image of today's weather for the area A and the image of tomorrow's weather across the country. For example, the display controller 108 may output the response information containing screen information where a plurality of processing details extracted by the processing detail inferring unit 104 are alternately displayed every fixed period. That is, the display controller 108 alternately displays the image of today's weather for the area A and the image of tomorrow's weather across the country every fixed period.

In response to the output of the response information, the user says, "not that one". The utterance semantic analyzer 101 of the information processing device 1 receives the utterance of "not that one". The processing detail inferring unit 104 specifies, as the processing detail corresponding to the voice operation received by the utterance semantic analyzer 101, processing of displaying an image different from the image representing the result of the processing currently displayed from the processing of displaying today's weather for the area A and the processing of displaying tomorrow's weather across the country. That is, the processing detail inferring unit 104 specifies the processing of displaying tomorrow's weather across the country as the processing detail corresponding to the voice operation received by the utterance semantic analyzer 101. Then, the processing execution unit 105 executes the processing of displaying tomorrow's weather across the country. The display controller 108 causes the image output unit 16 to output the screen of tomorrow's weather across the country.

As described above, according to the second processing example, the information processing device 1 can specify processing of interest indicated by an ambiguous voice operation by causing the processing detail to be selected from choices of the processing details corresponding to the voice operation.

Third Processing Example According to First Embodiment

Figure 6:
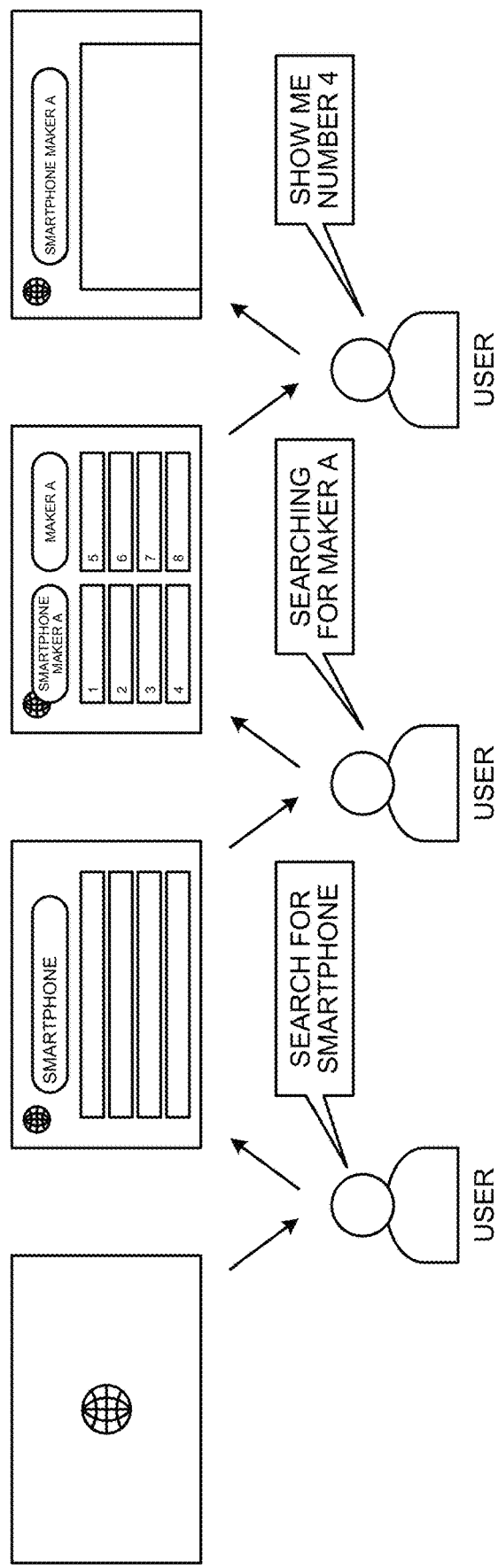
FIG. 6 is a diagram illustrating an example of the flow of processing executed by the information processing device according to the first embodiment of the present disclosure.

FIG. 6 is a diagram illustrating an example of the flow of processing executed by the information processing device 1 according to the first embodiment. Further, FIG. 6 illustrates processing of making a web search by the voice operation.

When the user says, "search for a smartphone" on a search screen, the display controller 108 displays a search result screen showing the result of the search for a smartphone. The user further says, "search for the maker A" on the search result screen. The utterance semantic analyzer 101 receives a voice operation of "play the animation A".

The processing detail inferring unit 104 infers a processing detail corresponding to the voice operation issued by the user. Here, the user says, "search for the maker A", but the user's utterance has no content specifying either the addition of a search item or a new search. Therefore, the processing detail inferring unit 104, the processing detail inferring unit 104 extracts, as processing details, processing of searching for the maker A and processing of searching for a smartphone and the maker A from the processing classification table 111.

The response generation unit 106 generates response information containing screen information including an image representing the result of the search for the maker A and an image representing the result of the search for a smartphone and the maker A. At this time, the response generation unit 106 generates response information containing an identification number that makes each search result identifiable, thereby making the search result specifiable. The display controller 108 causes the image output unit 16 to display the screen information contained in the response information. At this time, when the response information contains voice information, the voice controller 107 causes the voice output unit 15 to output the sound of a corresponding voice.

In response to the output of the response information, the user says, "show me the number 4". The utterance semantic analyzer 101 receives a voice operation of "show me the number 4". That is, the utterance semantic analyzer 101 receives a voice operation that requests the display of the result of the search for a smartphone and the maker A. The processing detail inferring unit 104 specifies, as the processing detail corresponding to the voice operation received by the utterance semantic analyzer 101, the processing of searching for a smartphone and the maker A from the processing for searching for the maker A and the processing for searching for a smartphone and the maker A. Then, the processing execution unit 105 executes the processing of searching for a smartphone and the maker A. The display controller 108 causes the image output unit 16 to output screen information representing the result of the search for a smartphone and the maker A, that is, the result of the search for the number 4.

As described above, according to the third processing example, the information processing device 1 can specify processing of interest indicated by an ambiguous voice operation by causing the processing detail to be selected from choices of the processing details corresponding to the voice operation.

Fourth Processing Example According to First Embodiment

Figure 7:
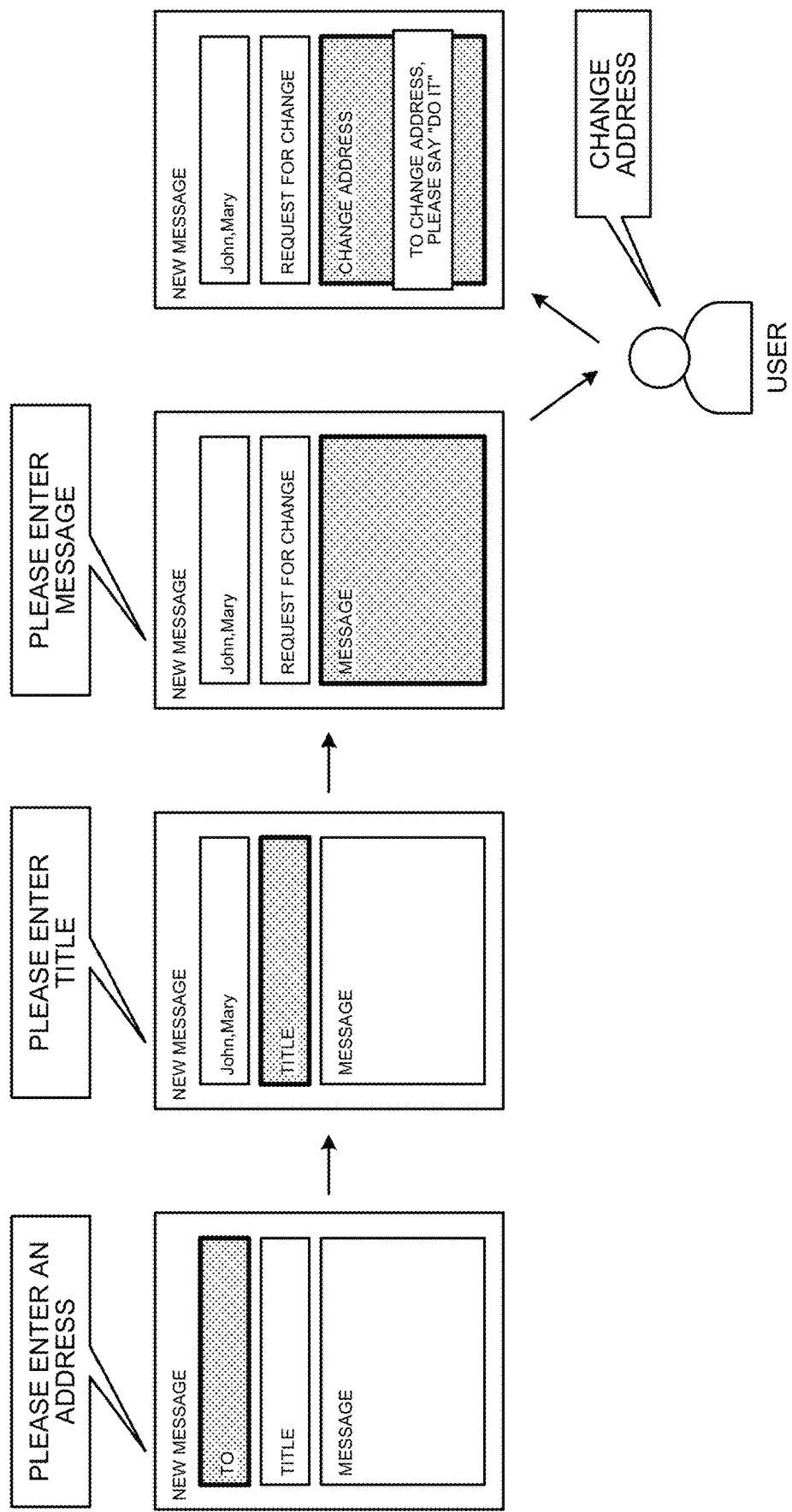
FIG. 7 is a diagram illustrating an example of the flow of processing executed by the information processing device according to the first embodiment of the present disclosure.

FIG. 7 is a diagram illustrating an example of the flow of processing executed by the information processing device 1 according to the first embodiment. Further, FIG. 7 illustrates processing of inputting various types of information to a message application such as mail by the voice operation.

The display controller 108 displays a message input screen. Further, the display controller 108 highlights an address entry field where an address of a message is entered. Furthermore, the voice controller 107 outputs the sound of a voice "please enter an address". This causes the information processing device 1 to request the entry of an address.

The display controller 108 highlights a title entry field where a title is entered. Furthermore, the voice controller 107 outputs the sound of a voice "please enter a title". This causes the information processing device 1 to request the entry of a title.

The display controller 108 highlights a message entry field where a message serving as a body is entered. Furthermore, the voice controller 107 outputs the sound of a voice "please enter a message". This causes the information processing device 1 to request the entry of a message.

In such a state, the user says, "change the address". The utterance semantic analyzer 101 receives a voice operation of "change the address". Here, the user says, "change the address", but the user's utterance has no content specifying either an operation of entering a message of "change the address" or an operation of changing the address in the address entry field. Therefore, the processing detail inferring unit 104 extracts, as the processing detail corresponding to the voice operation, a processing execution instruction and an entry of a character string by the voice operation. That is, the processing detail inferring unit 104 extracts processing of entering the message "change the address" and processing of changing the address.

The response generation unit 106 generates response information containing screen information representing a method for selecting a processing detail from a plurality of processing details. For example, the response generation unit 106 generates response information containing screen information including an image of the message entry field where a message of "change the address" has been entered and a notification image showing "To change the address, please say, "do it"". Further, the response information may contain voice information representing the method for selecting a processing detail from a plurality of processing details. For example, the response information may contain voice information of "To change the address, please say, "do it"".

The display controller 108 outputs the response information for making selection of the processing detail from the processing execution instruction and the entry of a character string. That is, the display controller 108 causes the image output unit 16 to display the screen information contained in the response information. Further, when the response information contains the voice information, the voice controller 107 causes the voice output unit 15 to output the sound of a corresponding voice.

As described above, according to the fourth processing example, the information processing device 1 can specify processing of interest indicated by an ambiguous voice operation by outputting the method for selecting the processing detail corresponding to the voice operation.

Fifth Processing Example According to First Embodiment

Figure 8:
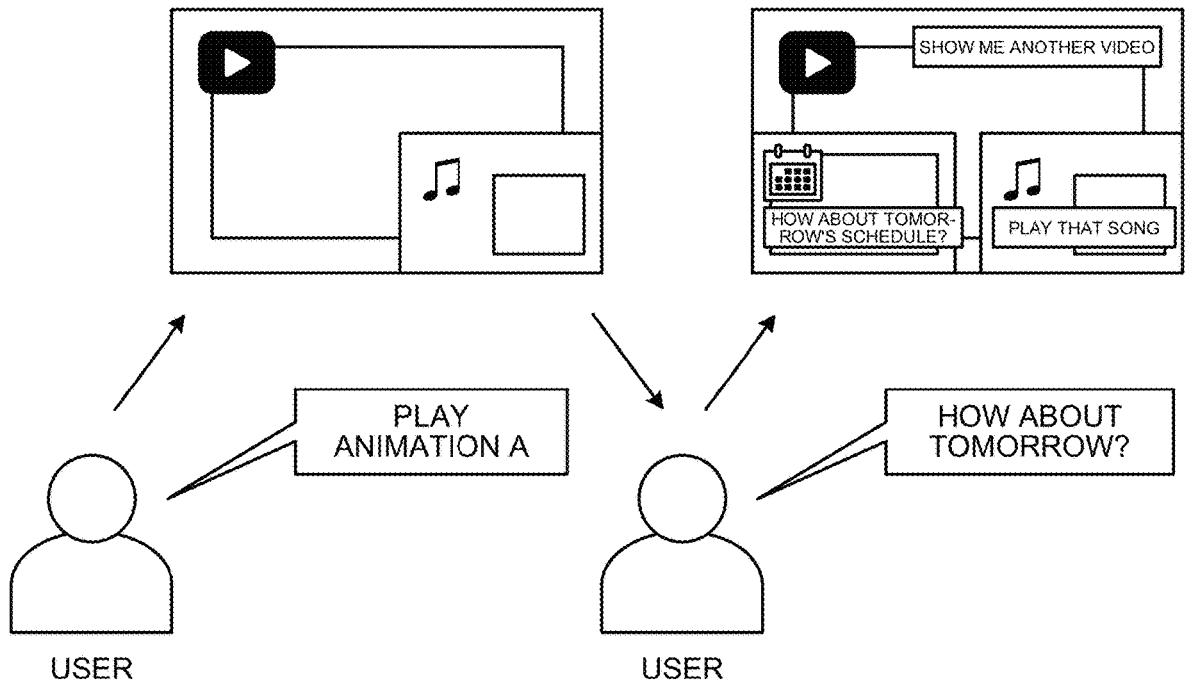
FIG. 8 is a diagram illustrating an example of the flow of processing executed by the information processing device according to the first embodiment of the present disclosure.

FIG. 8 is a diagram illustrating an example of the flow of processing executed by the information processing device 1 according to the first embodiment. The flow of processing illustrated in FIG. 8 depicts that, when the number of processing details contained in response information, that is, the number of processing details corresponding to the user's utterance is equal to or greater than a threshold, a phrase that makes a corresponding processing detail specifiable is displayed.

The user says, "play the animation A". As is the case illustrated in FIG. 3, the processing detail inferring unit 104 extracts, as processing details, the processing of playing a video and the processing of playing music from the processing classification table 111. The display controller 108 displays a screen containing the video playback image where a video is played and the music playback image where music is played.

In such a state, the user says, "how about tomorrow?". The utterance semantic analyzer 101 receives a voice operation of "how about tomorrow?". Here, the user's utterance has no content indicating a cancellation of the playback of a video or a cancellation of the playback of music. Therefore, the processing detail inferring unit 104 extracts, as a processing detail, processing of displaying tomorrow's schedule from the processing classification table 111, in addition to the processing of playing a video and the processing of playing music extracted by the first voice operation.

It is assumed that the number of processing details extracted by the processing detail inferring unit 104 becomes equal to or greater the threshold as a result of adding the processing of displaying tomorrow's schedule. That is, it is assumed that the number of processing details corresponding to the voice operation issued by the user becomes equal to or greater than the threshold. In this case, the response generation unit 106 generates response information containing screen information representing a phrase that makes a corresponding one of the plurality of processing details specifiable. Therefore, the response information contains "show me another video", which is a phrase for specifying the processing of playing a video, "how about tomorrow's schedule?", which is a phrase for specifying the processing of playing music, and "play that song", which is a phrase for specifying the processing of displaying a schedule. Then, the display controller 108 causes the image output unit 16 to display screen information contained in the response information. Note that such phrases may be output via not only the screen display but also the sound of a voice. In this case, the response information contains voice information on the phrases.

As described above, according to the fifth processing example, the information processing device 1 outputs a phrase indicating each processing detail corresponding to the voice operation so as to allow the user to easily select a processing detail. This allows the information processing device 1 to specify processing of interest indicated by an ambiguous voice operation.

Sixth Processing Example According to First Embodiment

Figure 9:
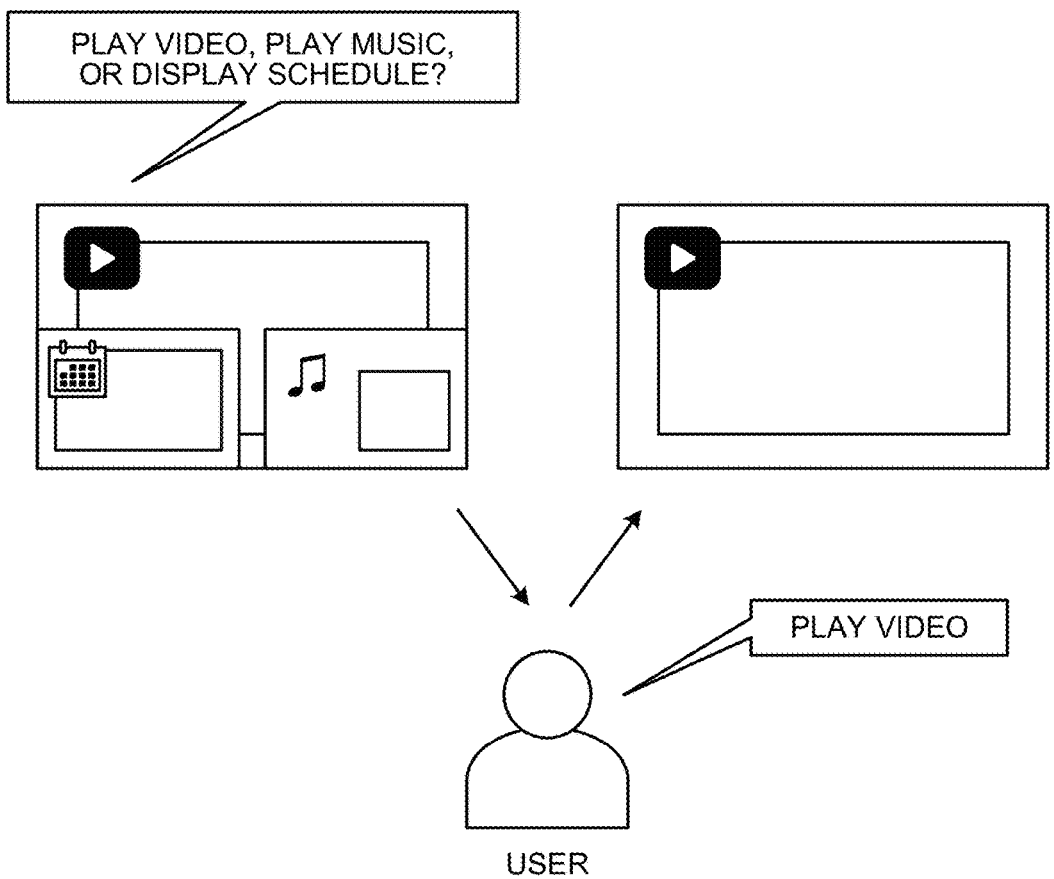
FIG. 9 is a diagram illustrating an example of the flow of processing executed by the information processing device according to the first embodiment of the present disclosure.

FIG. 9 is a diagram illustrating an example of the flow of processing executed by the information processing device 1 according to the first embodiment. The flow of processing illustrated in FIG. 9 depicts that causing an application that executes each processing detail to be selected causes processing details to be narrowed down.

As is the case illustrated in FIG. 8, the processing detail inferring unit 104 extracts, as processing details, the processing of playing a video, the processing of playing music, and the processing of displaying tomorrow's schedule from the processing classification table 111. In this case, it is assumed that the number of applications that each execute a corresponding processing detail is three: an application that plays a video, an application that plays music, and an application that displays tomorrow's schedule. Then, it is assumed that the number of applications that each execute a corresponding one of the processing details extracted by the processing detail inferring unit 104 is equal to or greater than the threshold.

When the number of applications that each execute a corresponding one of the processing details extracted by the processing detail inferring unit 104 is equal to or greater than the threshold, the response generation unit 106 generates response information containing screen information for making selection of an application. For example, the response generation unit 106 generates response information containing voice information including a phrase "play a video, play music, or display a schedule?" for making selection of an application. The voice controller 107 causes the voice output unit 15 to output the response information thus generated. Further, the response generation unit 106 may generate response information containing screen information that causes the phrase "play a video, play music, or display a schedule?" for making selection of an application to be displayed. In this case, the display controller 108 causes the image output unit 16 to display the screen information contained in the response information. That is, when the number of applications that each execute a corresponding one of the processing details extracted by the processing detail inferring unit 104 is equal to or greater than the threshold, the display controller 108 outputs the response information for making selection of an application.

In response to the output of the response information, the user says, "play a video". The utterance semantic analyzer 101 receives a voice operation of "play a video" issued by the user. This causes the processing detail inferring unit 104 to specify the application that plays a video as the application that executes the processing detail corresponding to the voice operation issued by the user. Therefore, the processing detail inferring unit 104 specifies, as the processing detail corresponding to the voice operation issued by the user, the processing of playing a video from the processing of playing a video, the processing of playing music, and the processing of displaying tomorrow's schedule. The processing execution unit 105 executes the processing of playing a video. Then, the display controller 108 causes the image output unit 16 to display the processing of playing a video.

As described above, according to the sixth processing example, the information processing device 1 can narrow down a plurality of processing details by causing an application that executes the processing detail corresponding to the voice operation to be selected. This allows the information processing device 1 to specify processing of interest indicated by an ambiguous voice operation.

Seventh Processing Example According to First Embodiment

Figure 10:
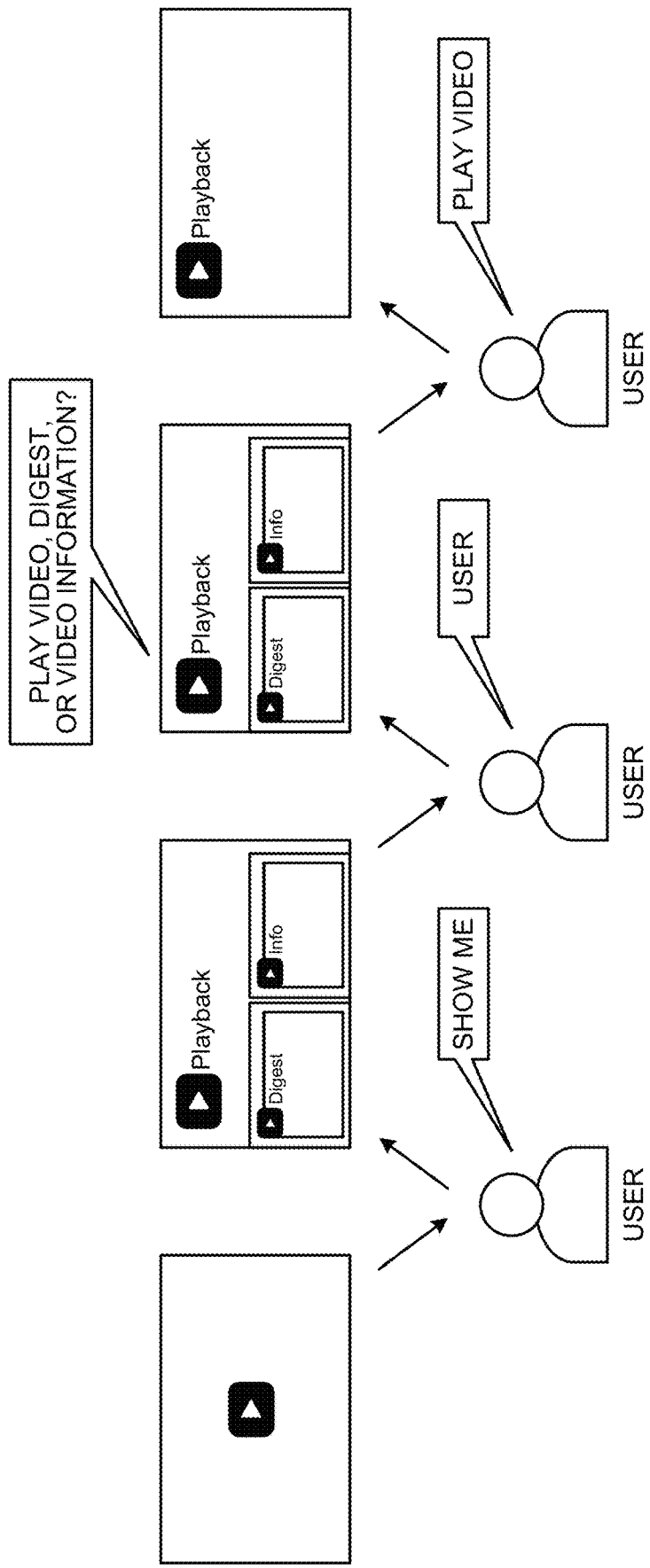
FIG. 10 is a diagram illustrating an example of the flow of processing executed by the information processing device according to the first embodiment of the present disclosure.

FIG. 10 is a diagram illustrating an example of the flow of processing executed by the information processing device 1 according to the first embodiment. The flow of processing illustrated in FIG. 10 depicts that, when the number of processing details corresponding to the voice operation issued by the user becomes equal to or greater than the threshold, response information containing screen information for making selection of the processing detail from processing details corresponding to the voice operation previously received is output.

The user says, "show me" while the video playback image is being displayed. The utterance semantic analyzer 101 receives a voice operation of "show me" issued by the user. The user says, "show me", but the user's utterance has no content specifying an object of interest. Therefore, the processing detail inferring unit 104 extracts, as processing details, the processing of playing a video, processing of displaying a digest of a video, and processing of displaying information on a video from the processing classification table 111.

The response generation unit 106 generates response information containing screen information including a video playback image where a video is played, a digest image where a digest of a video is displayed, and a video information image where information on a video is displayed. The display controller 108 causes the image output unit 16 to display the screen information contained in the response information.

In such a state, the user says, "more". The utterance semantic analyzer 101 receives a voice operation of "more" issued by the user. Here, since the user says, "more", the processing detail inferring unit 104 infers that the user makes a request for further display something. The user, however, specifies no object of interest from among the video, the digest, and the video information.

Therefore, the processing detail inferring unit 104 extracts a plurality of processing details related to the video, the digest, and the video information from the processing classification table 111. For the video, the processing detail inferring unit 104 extracts, for example, processing of displaying another video. For the digest, the processing detail inferring unit 104 extracts, for example, processing of displaying a digest of another video or processing of displaying a more detailed digest. For the video information, the processing detail inferring unit 104 extracts, for example, processing of displaying a website explaining the video and processing of displaying information such as a story.

As described above, upon receipt of the voice operation without specifying an object of interest, the processing detail inferring unit 104 tends to extract a large number of processing details. The information processing device 1, however, is finite in display area and the like and thus may fail to display all of the large number of processing details. Further, even when it is possible to display all of the large number of processing details, it is difficult to find a desired processing detail from the large number of processing details.

Therefore, when the number of processing details extracted by the processing detail inferring unit 104 is equal to or greater than the threshold, the response generation unit 106 generates response information containing screen information for making selection of the processing detail from the processing details corresponding to the voice operation previously received by the utterance semantic analyzer 101. For example, the response generation unit 106 generates response information containing voice information for outputting the sound of a voice of "play a video, digest, or video information". Further, when the response information contains the voice information, the voice controller 107 causes the voice output unit 15 to output the sound of a corresponding voice. That is, when the number of processing details extracted by the processing detail inferring unit 104 is equal to or greater than the threshold, the voice controller 107 outputs response information containing screen information for making selection of the processing detail from the processing details corresponding to the voice operation previously received by the utterance semantic analyzer 101.

In response to the output of the response information, the user says, "play a video". The utterance semantic analyzer 101 receives a voice operation of "play a video" issued by the user. This causes the processing detail inferring unit 104 to specify that the processing detail corresponding to the voice operation issued by the user is the playback of a video. Then, the display controller 108 causes the image output unit 16 to display the processing of playing a video.

As described above, according to the seventh processing example, the information processing device 1 can narrow down a plurality of processing details by causing the processing detail corresponding to the previous voice operation to be selected. This allows the information processing device 1 to specify processing of interest indicated by an ambiguous voice operation.

Eighth Processing Example According to First Embodiment

Figure 11:
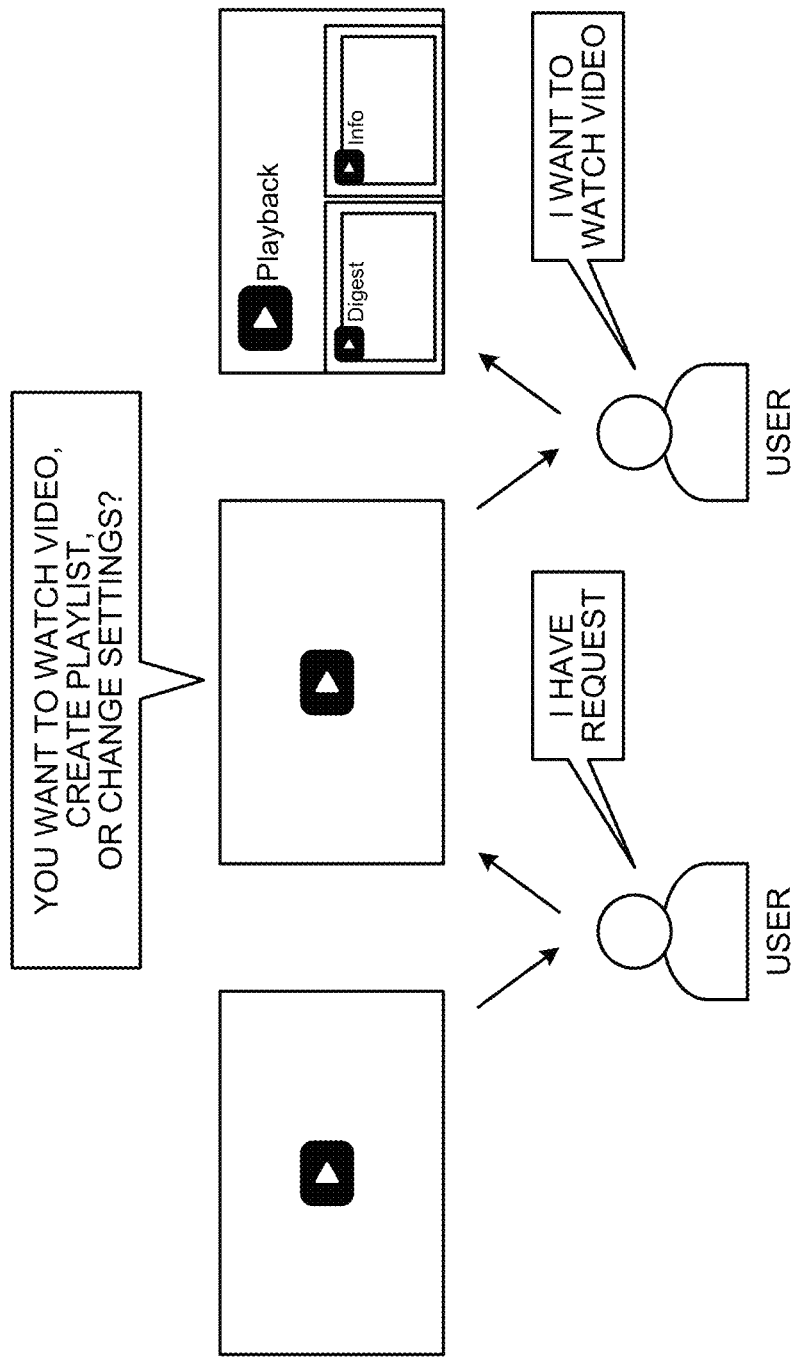
FIG. 11 is a diagram illustrating an example of the flow of processing executed by the information processing device according to the first embodiment of the present disclosure.

FIG. 11 is a diagram illustrating an example of the flow of processing executed by the information processing device 1 according to the first embodiment. The flow of processing illustrated in FIG. 11 depicts that, when the number of processing details corresponding to the voice operation issued by the user is equal to or greater than the threshold, causing a processing category to be selected causes processing details to be narrowed down.

The user says, "I have a request" while the video playback image in the initial state is being displayed. The utterance semantic analyzer 101 receives a voice operation of "I have a request" issued by the user. Here, the user says, "I have a request" to request some processing. The user, however, specifies no object of interest. The processing detail inferring unit 104 extracts a plurality of processing details from the processing classification table 111.

At this time, it is assumed that the processing detail inferring unit 104 has extracted a number of processing details equal to or greater than the threshold. However, since it is the initial state of the video playback image, that is, the first time of extracting the processing details, the processing details corresponding to the voice operation cannot be narrowed down by specifying a plurality of processing details previously extracted. Therefore, when the number of the plurality of processing details extracted by the processing detail inferring unit 104 is equal to or greater than the threshold, the response generation unit 106 generates response information for making selection of a category of the processing detail. Note that, for the response generation unit 106, it is not limited to a category, and may be an operation higher in level than the extracted operation, an application, or an application category.

For example, the response generation unit 106 generates response information containing displaying a video, creating a playlist, and changing settings as a category of processing details. For example, the response generation unit 106 generates response information containing voice information for outputting the sound of a voice of, for example, "You want to watch a video, create a playlist, or change settings?". Then, when the number of the plurality of processing details extracted by the processing detail inferring unit 104 is equal to or greater than the threshold, the voice controller 107 outputs the response information for making selection of a category of the processing detail. That is, the voice controller 107 outputs the sound of a voice of, for example, "You want to watch a video, create a playlist, or change settings?" based on the voice information contained in the response information. Note that the response generation unit 106 may generate response information containing screen information. In this case, the display controller 108 causes the image output unit 16 to display a screen for making selection of a category of the processing detail based on the screen information contained in the response information.

In response to the output of the response information, the user says "I want to watch a video". The utterance semantic analyzer 101 receives a voice operation of "I want to watch a video" issued by the user. This causes the processing detail inferring unit 104 to specify a category of the processing detail corresponding to the voice operation received by the utterance semantic analyzer 101. Further, the processing detail inferring unit 104 generates response information containing a plurality of processing details belonging to the category thus specified. That is, the response generation unit 106 generates response information containing screen information including a video playback image where a video is played, a digest image where a digest of a video is displayed, and a video information image where information on a video is displayed. Further, the display controller 108 causes the image output unit 16 to display the screen information contained in the response information.

As described above, according to the seventh processing example, the information processing device 1 can narrow down a plurality of processing details by causing a category of the processing detail corresponding to the voice operation to be selected. This allows the information processing device 1 to specify processing of interest indicated by an ambiguous voice operation.

Flow of Specifying Processing According to First Embodiment

Figure 12:
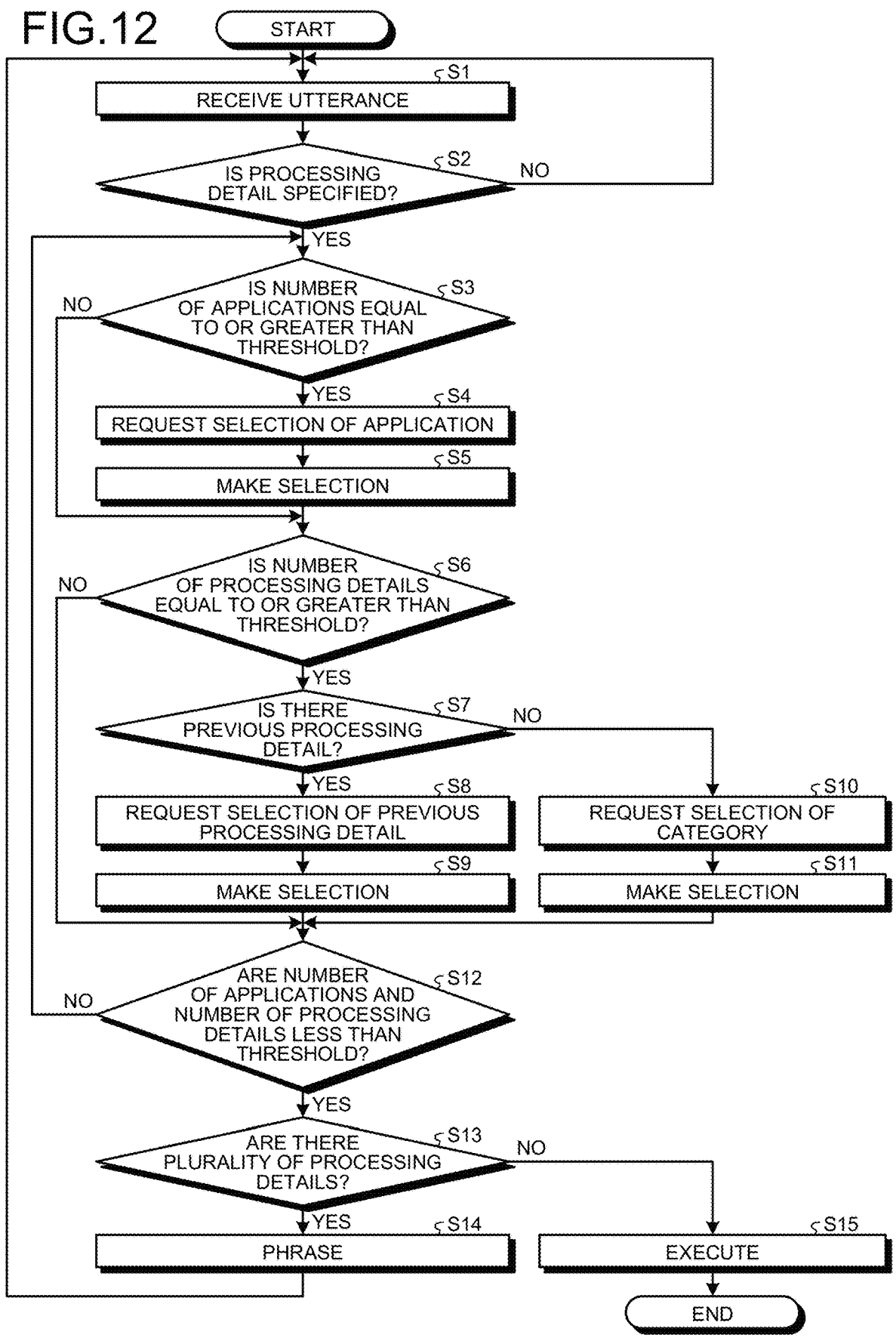
FIG. 12 is a flowchart illustrating an example of specifying processing executed by the information processing device according to the first embodiment of the present disclosure.

Next, a description will be given of specifying processing executed by the information processing device 1 according to the first embodiment. The specifying processing is processing of specifying a processing detail corresponding to a user's utterance. FIG. 12 is a flowchart illustrating an example of the specifying processing executed by the information processing device 1 according to the first embodiment.

The utterance semantic analyzer 101 receives an operation in the form of a user's utterance (Step S1). In other words, the utterance semantic analyzer 101 receives a voice operation.

The processing detail inferring unit 104 determines whether the processing detail corresponding to the user's utterance can be specified (Step S2). That is, the processing detail inferring unit 104 determines whether there are a plurality of application categories, applications, processing categories, or processing details corresponding to the voice operation. When the processing detail can be specified because there is only one processing detail corresponding to the voice operation issued by the user (Step S2; No), the information processing device 1 proceeds to Step S1 and receives the next voice operation issued by the user.

When the processing detail cannot be specified because there are a plurality of processing details corresponding to the voice operation issued by the user (Step S2; Yes), the processing detail inferring unit 104 determines whether the number of extracted applications is equal to or greater than the threshold (Step S3). When the number of applications is less than the threshold (Step S3; No), the information processing device 1 proceeds to Step S6.

When the number of applications is equal to or greater than the threshold (Step S3; Yes), the display controller 108 or the voice output unit 15 outputs response information for making selection from the applications (Step S4). More specifically, the response generation unit 106 generates response information for narrowing down the plurality of applications that execute the plurality of processing details extracted by the processing detail inferring unit 104. For example, the response generation unit 106 generates response information for making selection of at least one application from the plurality of applications. The display controller 108 or the voice output unit 15 outputs the response information.

The utterance semantic analyzer 101, the sensor information analyzer 102, or the operation controller 103 receives an operation of making selection of at least one application from the plurality of applications (Step S5).

The processing detail inferring unit 104 determines whether the number of processing details corresponding to the user's utterance is equal to or greater than the threshold (Step S6). When the number of processing details is less than the threshold (Step S6; No), the information processing device 1 proceeds to Step S12.

When the number of processing details corresponding to the user's utterance is equal to or greater than the threshold (Step S6; Yes), the processing detail inferring unit 104 determines whether there is an extracted processing detail corresponding to the previous voice operation (Step S7).

When there is an extracted processing detail corresponding to the previous voice operation (Step S7; Yes), the display controller 108 or the voice output unit 15 outputs response information for making selection of the previous processing detail (Step S8). More specifically, the response generation unit 106 generates response information for making selection of at least one processing detail from a plurality of the previous processing details. The display controller 108 or the voice output unit 15 outputs the response information.

The utterance semantic analyzer 101, the sensor information analyzer 102, or the operation controller 103 receives an operation for making selection of at least one processing detail from the plurality of previous processing details (Step S9).

When there is no extracted processing detail corresponding to the previous voice operation (Step S7; No), the display controller 108 or the voice output unit 15 outputs response information for making selection of a category of a processing detail extracted by the processing detail inferring unit 104 (Step S10). More specifically, the response generation unit 106 generates response information for making selection of at least one category from among a plurality of categories of processing details extracted by the processing detail inferring unit 104. The display controller 108 or the voice output unit 15 outputs the response information.

The utterance semantic analyzer 101, the sensor information analyzer 102, or the operation controller 103 receives an operation of making selection of at least one category from the plurality of categories (Step S11).

The processing detail inferring unit 104 determines whether the number of applications is less than the threshold, and the number of processing details is less than the threshold (Step S12). When the number of applications is equal to or greater than the threshold or the number of processing details is equal to or greater than the threshold (Step S12; No), the information processing device 1 proceeds to Step S3.

When the number of applications is less than the threshold, and the number of processing details is less than the threshold (Step S12; Yes), the processing detail inferring unit 104 determines whether there are a plurality of the processing details (Step S13). That is, the processing detail inferring unit 104 determines whether the processing detail corresponding to the voice operation issued by the user can be specified.

When the processing detail corresponding to the voice operation issued by the user cannot be specified because there are a plurality of processing details (Step S13; Yes), the display controller 108 or the voice output unit 15 outputs response information containing a phrase for specifying the operation (Step S14). More specifically, the response generation unit 106 generates response information containing a phrase for specifying the processing detail. The display controller 108 or the voice output unit 15 outputs the response information. Then, the information processing device 1 proceeds to Step S1.

When the processing detail corresponding to the voice operation issued by the user can be specified because there is only one processing detail (Step S13; No), the processing execution unit 105 executes the processing detail thus specified (Step S15). More specifically, when only one processing detail is extracted, the processing detail inferring unit 104 specifies the processing detail thus extracted as the processing detail corresponding to the user's utterance. The processing execution unit 105 executes the processing detail specified by the processing detail inferring unit 104.

As described above, in the information processing device 1 according to the first embodiment, the utterance semantic analyzer 101 receives a voice operation issued by the user. The processing detail inferring unit 104 extracts the processing detail corresponding to the voice operation from the processing classification table 111 based on the result of the analysis of the user's utterance corresponding to the voice operation made by the utterance semantic analyzer 101. When the processing detail corresponding to the voice operation cannot be specified because there are a plurality of processing details extracted by the processing detail inferring unit 104, the response generation unit 106 generates response information for narrowing down the plurality of processing details. That is, the response generation unit 106 generates response information for making selection of at least one processing detail from the plurality of processing details extracted by the processing detail inferring unit 104. Further, the voice controller 107 or the display controller 108 outputs the response information via the sound of a voice or display. Then, the processing detail inferring unit 104 specifies the processing detail corresponding to the voice operation received by the utterance semantic analyzer 101 based on an operation of selecting a processing detail contained in the response information or the like. This allows the information processing device 1 to specify processing of interest indicated by an ambiguous voice operation.

Second Embodiment

Structure of Information Processing Device 1a According to Second Embodiment

Figure 13:
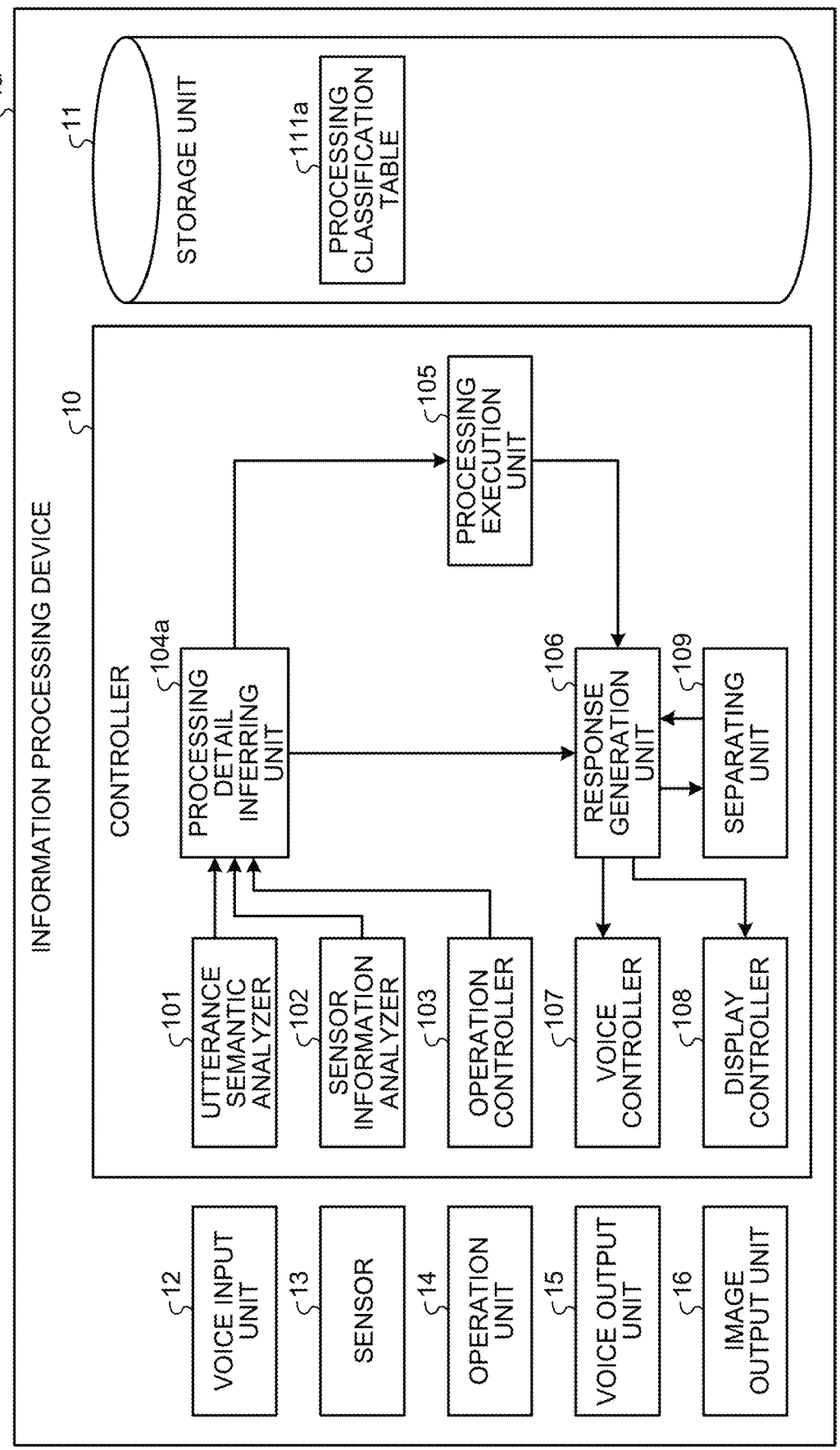
FIG. 13 is a diagram illustrating an example of a flow of processing executed by an information processing device according to a second embodiment of the present disclosure.

FIG. 13 is a diagram illustrating an example of a flow of processing executed by an information processing device 1a according to a second embodiment. When there are a plurality of processing details corresponding to a voice operation issued by the user, the information processing device 1a cannot specify a processing detail corresponding to a user's utterance. Therefore, the information processing device 1a outputs a response for causing the user to narrow down the processing details. Specifically, the information processing device 1a outputs response information for making selection of at least one processing detail from the plurality of extracted processing details. Then, the user selects a processing detail in accordance with the response information. As described above, the information processing device 1a interacts with the user to specify the processing detail corresponding to the user's utterance.

The interaction between the user and the information processing device 1a, however, is a bother to the user, and it is therefore required to further reduce the number of times of interactions. For example, the information processing device 1a outputs response information representing a list of choices of the processing detail corresponding to the voice operation issued by the user. Then, the user selects a processing detail from the list of choices of the processing detail. This can reduce the number of times of interaction between the information processing device 1a and the user from to one time.

It is, however, finite in display area where the response information can be displayed. Further, when the response information is output via the sound of a voice, and the sound of a voice indicating the processing detail is output for a long time, operability is reduced. The information processing device 1a according to the second embodiment outputs response information that allows a more efficient reduction in the number of times of interaction with the user.

As illustrated in FIG. 13, the information processing device 1a according to the second embodiment includes a separating unit 109. The separating unit 109 is an example of a separating unit. The separating unit 109 separates a plurality of extracted processing details into a plurality of groups. More specifically, the separating unit 109 separates a plurality of processing details extracted by a processing detail inferring unit 104a into groups such that the number of times of interaction with the user can be more efficiently reduced. Specifically, the separating unit 109 obtains an expectation value based on a weight coefficient indicating the possibility that each processing detail extracted by the processing detail inferring unit 104a corresponds to the voice operation. Then, the separating unit 109 selects a method for separating the groups based on the expectation value indicating the number of processing details predicted to remain after the selection from the groups is made.

The response generation unit 106 generates response information for making selection from the groups obtained as a result of the separation made by the separating unit 109. Further, the voice controller 107 or the display controller 108 outputs response information for making selection from the groups obtained as a result of the separation made by the separating unit 109. As described above, the information processing device 1a according to the second embodiment can reduce the number of times of interaction with the user more efficiently by causing a group obtained as a result of the separation made according to conditions to be selected.

When the number of processing details extracted by the processing detail inferring unit 104a is greater than an upper limit value, the separating unit 109 separates the processing details into a plurality of groups. At this time, the separating unit 109 makes the number of groups less than the upper limit value. Here, the upper limit value is a value serving as a criterion for a reduction in operability when all the processing details extracted by the processing detail inferring unit 104a are presented. More specifically, when all of the large number of processing details are displayed, a display area allocated to each processing detail becomes small, which makes it difficult for the user to visually recognize the processing detail and thus reduces operability. The upper limit value is a value serving as a criterion for such a reduction in operability.

Further, the upper limit value may be a value set in accordance with a type of the information processing device 1a, may be a value set by the user or the like, or may be a value set by another method. Furthermore, the upper limit value may be a value that varies in a manner that depends on an operation state of the information processing device 1a. For example, when there is an application already displayed, the display area of the response information becomes small. Accordingly, the display area of each processing detail also becomes small. Changing the upper limit value according to conditions can prevent a reduction in operability. For example, when the information processing device 1a is not used, the upper limit value is 4. On the other hand, when the information processing device 1a is used, the upper limit value is 2.

Here, in a processing classification table 111a according to the second embodiment, a weight coefficient is set for each processing detail. The processing detail inferring unit 104a extracts data containing the weight coefficient when extracting the processing detail. Then, the separating unit 109 obtains the expectation value based on the weight coefficient for each processing detail extracted by the processing detail inferring unit 104a from the processing classification table 111a.

FIG. 14 is a diagram illustrating an example of a structure of data extracted from the processing classification table 111a according to the second embodiment. The processing detail inferring unit 104a extracts the processing detail, the processing detail category, and the weight coefficient from the processing classification table 111a. The processing detail is a processing detail extracted by the processing detail inferring unit 104a. The processing detail category is a category of the processing detail. The weight coefficient is a set value indicating the possibility that an associated processing detail corresponds to the voice operation. For example, as the weight coefficients illustrated in FIG. 14 increase, the possibility of correspondence increases. For example, the weight coefficient is a value set based on a frequency in use of the corresponding processing detail.

Note that the weight coefficient is not limited to a value set based on a frequency in use, and may be a value set by the user or the like, or may be another value. Furthermore, when the weight coefficient is set based on the frequency in use of the corresponding processing detail, the information processing device 1a may include a measuring unit that measures a frequency in use. Then, the measuring unit may set the weight coefficient in the processing classification table 111a based on the frequency in use thus measured.

The separating unit 109 obtains the expectation value under each separation method using the weight coefficient. Then, the separating unit 109 separates the plurality of processing details into groups by a separation method that makes the expectation value the lowest, that is, a separation method by which the processing details can be narrowed down to the greatest extent possible. Example of the separation method include an equality-based separation method for equally separating processing details, a category-based separation method for separating processing details by category, and a weight coefficient-based separation method for separation processing details based on the weight coefficient. Note that these separation methods are merely examples, and the separation may be made by a different method.

First, the separating unit 109 obtains a group expectation value for each group using the following equation (1). Then, the separating unit 109 obtains an expectation value by adding up the group expectation value for each group. The group expectation value is obtained by the equation (1).

Group expectation value=number of grouped processing details*group weight coefficient/total weight coefficient     (1).

The number of grouped processing details corresponds to the number of processing details belonging to each group.

The group weight coefficient corresponds to the sum of weight coefficients of processing details belonging to each group.

The total weight coefficient corresponds to the sum of weight coefficients of processing details extracted by the processing detail inferring unit 104a.

A description will be given below of a case where the data illustrated in FIG. 14 is extracted as an example of the separation method by the separating unit 109. FIG. 14 is a diagram illustrating an example of a data structure of data extracted by the processing detail inferring unit 104a according to the second embodiment. In FIG. 14, the processing detail inferring unit 104a extracts "normal playback", "digest playback", "playback of beginning for one minute", "thumbnail display", "content information display", and "user review display" as processing details. The "normal playback" belongs to a "playback" category and has a weight coefficient equal to "10". The "digest playback" belongs to a "digest" category and has a weight coefficient equal to "5". The "playback of beginning for one minute" belongs to the "digest" category and has a weight coefficient equal to "4". The "thumbnail display" belongs to a "video information" category and has a weight coefficient equal to "2". The "content information display" belongs to the "video information" category and has a weight coefficient equal to "2". The "user review display" belongs to the "video information" category and has a weight coefficient equal to "2".

First, a description will be given of how to obtain the expectation value under the equality-based separation method. Under the equality-based separation method, the separating unit 109 equally separates processing details into groups. That is, for the data illustrated in FIG. 14, the separating unit 109 separates the processing details into three groups each including two processing details. For example, the separating unit 109 separates the processing details into a first group including "normal playback" and "digest playback", a second group including "playback of beginning for one minute" and "thumbnail display", and a third group including "content information display" and "user review display".

Further, the separating unit 109 obtains a group expectation value for each group using the equation (1). Then, the separating unit 109 obtains an expectation value by adding up the group expectation value for each group. Specifically, when the processing detail inferring unit 104a extracts the processing details illustrated in FIG. 14, the expectation value under the equality-based separation method is as follows:

Expectation value=(2*15/25)+(2*6/25)+(2*4/25)=2.00.

Next, a description will be given of how to obtain an expectation value under the category-based separation method. For the category-based separation method, the separating unit 109 separates processing details into groups on a category-by-category basis. For example, the separating unit 109 separates the processing details into a playback group including "normal playback", a digest group including "digest playback" and "playback of beginning for one minute", and a video information group including "thumbnail display", "content information display", and "user review display".

Further, the separating unit 109 obtains a group expectation value for each group using the equation (1). Then, the separating unit 109 obtains an expectation value by adding up the group expectation value for each group. Specifically, when the processing detail inferring unit 104a extracts the processing details illustrated in FIG. 14, the expectation value under the category-based separation method is as follows:

Expectation value=(1*10/25)+(2*9/25)+(3*6/25)=1.84.

Next, a description will be given of how to obtain an expectation value under the weight coefficient-based separation method. Under the weight coefficient-based separation method, the separating unit 109 separates processing details into groups based on a weight coefficient indicating the possibility that each of the processing details corresponds to the voice operation. For example, the separating unit 109 separates the processing details into groups in such a manner that processing details having larger weight coefficients each form a corresponding single group, and the remaining processing details are grouped together. For example, the separating unit 109 separates the processing details into a first-ranked group including "normal playback", a second-ranked group including "digest playback", and the other group including "playback of beginning for one minute", "thumbnail display", "content information display" and "user review display".

Further, the separating unit 109 obtains a group expectation value for each group using the equation (1). Then, the separating unit 109 obtains an expectation value by adding up the group expectation value for each group. Specifically, when the processing detail inferring unit 104a extracts the processing details illustrated in FIG. 14, the expectation value under the weight coefficient-based separation method is as follows:

Expectation value=(1*10/25)+(1*5/25)+(4*10/25)=2.24.

As described above, when the processing detail inferring unit 104a extracts the processing details illustrated in FIG. 14, the expectation value under the equality-based separation method is 2.00, the expectation value under the category-based separation method is 1.84, and the expectation value under the weight coefficient-based separation method is 2.24. Therefore, since the expectation value under the category-based separation method is the lowest, the separating unit 109 selects the category-based separation method. The response generation unit 106 generates response information for making selection of processing details from a plurality of groups separated by the separating unit 109 under the category-based separation method. Then, the voice controller 107 or the display controller 108 outputs the response information generated by the response generation unit 106.

As described above, in the information processing device 1a according to the second embodiment, the separating unit 109 separates a plurality of processing details extracted by the processing detail inferring unit 104a into a plurality of groups. For example, the separating unit 109 separates the plurality of processing details into groups based on an expectation value indicating the number of processing details predicted to remain after the selection from the groups is made. Further, the response generation unit 106 generates application information for making selection from the groups. Then, the voice controller 107 or the display controller 108 outputs the response information. This allows the information processing device 1a according to the second embodiment to reduce the number of times of interaction with the user more efficiently.

Note that, in the first embodiment and the second embodiment described above, an example where the information processing device 1, 1a is applied as, for example, a smart speaker or a smartphone has been described. Note that the information processing device 1, 1a may be applied to an in-vehicle device such as a navigation device, may be applied to an interactive UI such as a chatbot, may be applied to an online shop or an unmanned store, may be applied to an interactive digital signage, or may be applied to another device.

(Effects)

The information processing device 1, 1a includes the utterance semantic analyzer 101, the processing detail inferring unit 104, 104a, the voice controller 107 or the display controller 108, and the processing detail inferring unit 104, 104a. The utterance semantic analyzer 101 receives a voice operation. The processing detail inferring unit 104, 104a extracts a processing detail corresponding to the voice operation received by the utterance semantic analyzer 101. When the processing detail corresponding to the voice operation received by the utterance semantic analyzer 101 cannot be specified, the voice controller 107 or the display controller 108 outputs response information for making selection of at least one processing detail from a plurality of the processing details extracted by the processing detail inferring unit 104, 104a. The processing detail inferring unit 104, 104a specifies the processing detail selected from the plurality of processing details contained in the response information as the processing detail corresponding to the voice operation received by the utterance semantic analyzer 101.

As described above, the information processing device 1, 1a outputs the response information for making selection of at least one processing detail from the plurality of processing details extracted by the processing detail inferring unit 104, 104a. That is, the information processing device 1, 1a output the response information that allows the processing details to be narrowed down. This allows the information processing device 1, 1a to specify processing of interest indicated by an ambiguous voice operation.

The information processing device 1a further includes the separating unit 109 that separates the plurality of processing details extracted by the processing detail inferring unit 104a into a plurality of groups. The voice controller 107 or the display controller 108 outputs response information for making selection of the groups obtained as a result of the separation made by the separating unit 109.

As described above, the information processing device 1a separates a plurality of processing details into a plurality of groups, that is, outputs response information in which the plurality of processing details are grouped. This allows the information processing device 1a to ask the user about the plurality of processing details in a collective manner, so that the processing details can be efficiently narrowed down.

The separating unit 109 selects a method for separating the groups based on an expectation value indicating the number of processing details predicted to remain after the selection from the groups is made.

As described above, the information processing device 1a outputs response information containing processing details separated into groups based on the expectation value. This allows the information processing device 1a to efficiently narrow down the processing details.

The separating unit 109 obtains the expectation value based on a weight coefficient indicating the possibility that each processing detail extracted by the processing detail inferring unit 104a corresponds to the voice operation.

This allows the information processing device 1a to efficiently narrow down the processing details.

The separating unit 109 equally separates processing details into groups.

As described above, the information processing device 1a equally separates the processing detail. This allows the information processing device 1a to efficiently narrow down the processing details.

The separating unit 109 separates processing details into groups on a category-by-category basis.

As described above, the information processing device 1a separates the processing details into the groups on a category-by-category basis. This allows the information processing device 1a to efficiently narrow down the processing details.

The separating unit 109 separates the processing details into groups based on the weight coefficient indicating the possibility that each of the processing details corresponds to the voice operation.

As described above, the information processing device 1a separates the processing details into groups based on the weight coefficient indicating the possibility that each of the processing details corresponds to the voice operation. This allows the information processing device 1a to efficiently narrow down the processing details.

When the number of processing details extracted by the processing detail inferring unit 104a is greater than the upper limit value, the separating unit 109 separates the processing details into groups.

As described above, when the number of processing details is greater than the upper limit value, the information processing device 1a separates the processing details into groups. This allows the information processing device 1a to efficiently narrow down the processing details even when the number of processing details is greater than the upper limit value.

The upper limit value varies in a manner that depends on operation conditions of the information processing device 1.

As described above, when a display area is small due to, for example, the presence of an application currently displayed, the information processing device 1a separates a plurality of processing details into groups so as to allow the processing details to be displayed in the small display area. This allows the information processing device 1a to separate the processing details into groups in a manner that depends on conditions.

The utterance semantic analyzer 101 receives a voice operation corresponding to a plurality of processing details. The processing detail inferring unit 104 extracts a plurality of processing details corresponding to the voice operation. The display controller 108 outputs the response information containing the screen information for making selection of the processing detail from the plurality of processing details extracted by the processing detail inferring unit 104.

Accordingly, the information processing device 1 allows the processing detail corresponding to the voice operation to be selected on a processing detail selection screen.

The response information contains screen information representing a method for selecting a processing detail from a plurality of processing details.

This allows the user to understand the method for selecting a processing detail.

The response information contains screen information representing a phrase that makes each of the plurality of processing details specifiable.

This allows the user to easily select a desired processing detail even when there are a plurality of processing details.

The voice controller 107 or the display controller 108 outputs response information for making selection of an application when the number of applications that execute a plurality of processing details extracted by the processing detail inferring unit 104 is equal to or greater the threshold.

This allows the information processing device 1 to efficiently narrow down the processing details by causing an application to be selected when the number of applications is equal to or greater than the threshold.

When the number of the plurality of processing details extracted by the processing detail inferring unit 104 is equal to or greater than the threshold, the voice controller 107 of the display controller 108 outputs response information for making selection of a category of the processing detail.

This allows the information processing device 1 to efficiently narrow down the processing details by causing a category to be selected when the number of applications is equal to or greater than the threshold.

When the number of processing details extracted by the processing detail inferring unit 104 is equal to or greater than the threshold, the voice controller 107 of the display controller 108 outputs response information for making selection of the processing detail from the processing details corresponding to the voice operation previously received by the utterance semantic analyzer 101.

This allows, even when the extracting unit extracts a plurality of processing details, the information processing device 1 to efficiently narrow down the processing details because the processing details corresponding to the previously received voice operation are available.

The display controller 108 outputs response information containing screen information for causing a plurality of processing details extracted by the processing detail inferring unit 104 to be alternately displayed every fixed period.

This allows the user to easily select a desired processing detail even when there are a plurality of processing details.

The utterance semantic analyzer 101 receives a voice operation indicating specific wording associated with a specific processing detail. The processing detail inferring unit 104 extracts a processing detail associated with the wording and a processing detail inferred from the meaning of the wording in the initial state where the wording is not associated with the processing detail. The voice controller 107 or the display controller 108 outputs response information for making selection of the processing detail from a processing detail associated with the wording indicated by the voice operation and a processing detail inferred from the meaning of the wording in the initial state where the voice operation is not associated with the processing detail.

This allows, even with the sound of a voice uttered by the user registered as a macro, the information processing device 1 to specify the processing detail corresponding to the original meaning of the sound of an uttered voice as the processing detail corresponding to the voice operation.

The processing detail inferring unit 104 extracts, as the processing detail corresponding to the voice operation, a processing execution instruction and an entry of a character string by the voice operation. The voice controller 107 or the display controller 108 outputs response information for making selection of the processing detail from the processing execution instruction and the entry of a character string.

This allows the information processing device 1 to select the processing detail corresponding to the voice operation from the processing execution instruction and the entry of a character string.

Note that the effects described herein are merely examples and are not restrictively construed, and other effects may be provided.

Note that the present technology may also have the following configuration.

(1)

An information processing device comprising:

an input unit configured to receive a voice operation;

an extracting unit configured to extract a processing detail corresponding to the voice operation received by the input unit;

an output unit configured to output response information for making, when the processing detail corresponding to the voice operation received by the input unit cannot be specified, selection of at least one processing detail from a plurality of the processing details extracted by the extracting unit; and a specifying unit configured to specify the processing detail selected from the plurality of processing details contained in the response information as the processing detail corresponding to the voice operation received by the input unit.

(2)

The information processing device according to (1), further comprising a separating unit configured to separate the plurality of processing details extracted by the extracting unit into a plurality of groups, wherein the output unit outputs the response information for making selection from the groups obtained as a result of separation made by the separating unit.

(3)

The information processing device according to (2), wherein the separating unit selects a method for separating the groups based on an expectation value indicating a number of the processing details predicted to remain after the selection from the groups is made.

(4)

The information processing device according to (3), wherein the separating unit obtains the expectation value based on a weight coefficient indicating a possibility that each of the processing details extracted by the extracting unit corresponds to the voice operation.

(5)

The information processing device according to (3), wherein the separating unit equally separates the processing details into the groups.

(6)

The information processing device according to (3), wherein the separating unit separates the processing details into the groups on a category-by-category basis.

(7)

The information processing device according to (3), wherein the separating unit separates the processing details into the groups based on a weight coefficient indicating a possibility that each of the processing details corresponds to the voice operation.

(8)

The information processing device according to (3), wherein when a number of the processing details extracted by the extracting unit is greater than an upper limit value, the separating unit separates the processing details into the groups.

(9)

The information processing device according to (8), wherein the upper limit value varies in a manner that depends on operation conditions of the information processing device.

(10)

The information processing device according to (1), wherein the input unit receives the voice operation corresponding to the plurality of processing details, the extracting unit extracts the plurality of processing details corresponding to the voice operation, and the output unit outputs the response information containing screen information for making selection of the processing detail from the plurality of processing details extracted by the extracting unit.

(11)

The information processing device according to (10), wherein the response information contains the screen information representing a method for selecting the processing detail from the plurality of processing details.

(12)

The information processing device according to (10), wherein the response information contains the screen information representing a phrase that makes each of the plurality of processing details specifiable.

(13)

The information processing device according to (1), wherein when a number of applications configured to execute the plurality of processing details extracted by the extracting unit is equal to or greater than a threshold, the output unit outputs the response information for making selection from the applications.

(14)

The information processing device according to (1), wherein when a number of the plurality of processing details extracted by the extracting unit is equal to or greater than a threshold, the output unit outputs the response information for making selection of a category of the processing detail.

(15)

The information processing device according to (1), wherein when the plurality of processing details extracted by the extracting unit is equal to or greater than a threshold, the output unit outputs the response information for making selection of the processing detail from the processing details corresponding to the voice operation previously received by the input unit.

(16)

The information processing device according to (1), wherein the output unit outputs the response information containing screen information for causing the plurality of processing details extracted by the extracting unit to be alternately displayed every fixed period.

(17)

The information processing device according to (1), wherein the input unit receives the voice operation indicating specific wording associated with a corresponding one of the processing details, the extracting unit extracts the processing detail associated with the wording and the processing detail inferred based on a meaning of the wording in an initial state where the wording is not associated with the processing detail, and the output unit outputs the response information for making selection of the processing detail from the processing detail associated with the wording indicated by the voice operation and the processing detail inferred based on the meaning of the wording in the initial state where the voice operation is not associated with the processing detail.

(18)

The information processing device according to (1), wherein the extracting unit extracts a processing execution instruction and an entry of a character string by the voice operation as the processing detail corresponding to the voice operation, and the output unit outputs the response information for making selection of the processing detail from the processing execution instruction and the entry of a character string.

(19)

An information processing method comprising:

receiving a voice operation;

extracting a processing detail corresponding to the voice operation received;

outputting response information for making, when the processing detail corresponding to the voice operation received cannot be specified, selection of at least one processing detail from a plurality of the processing details extracted; and specifying the processing detail selected from the plurality of processing details contained in the response information as the processing detail corresponding to the voice operation.

(20)

A program for causing a computer included in an information processing device to function as:
- an input unit configured to receive a voice operation;
- an extracting unit configured to extract a processing detail corresponding to the voice operation received by the input unit;
- an output unit configured to output response information for making, when the processing detail corresponding to the voice operation received by the input unit cannot be specified, selection of at least one processing detail from a plurality of the processing details extracted by the extracting unit; and
- a specifying unit configured to specify the processing detail selected from the plurality of processing details contained in the response information as the processing detail corresponding to the voice operation received by the input unit.

REFERENCE SIGNS LIST 1, 1a INFORMATION PROCESSING DEVICE
10 CONTROLLER
11 STORAGE UNIT
12 VOICE INPUT UNIT
13 SENSOR
14 OPERATION UNIT
15 VOICE OUTPUT UNIT
16 IMAGE OUTPUT UNIT
101 UTTERANCE SEMANTIC ANALYZER
102 SENSOR INFORMATION ANALYZER
103 OPERATION CONTROLLER
104, 104a PROCESSING DETAIL INFERRING UNIT
105 PROCESSING EXECUTION UNIT
106 RESPONSE GENERATION UNIT
107 VOICE CONTROLLER
108 DISPLAY CONTROLLER
109 SEPARATING UNIT
111, 111a PROCESSING CLASSIFICATION TABLE

The invention claimed is:

1. An information processing device comprising:
circuitry that
- receives a voice operation of a user;
- extracts a processing detail corresponding to the voice operation that is received,
- outputs response information containing a plurality of processing details that are extracted as corresponding to the voice operation, for the user to make a selection of at least one processing detail from the plurality of processing details, under a condition that the processing detail corresponding to the voice operation cannot be specified;
- specifies the processing detail selected from among the plurality of processing details contained in the response information as the processing detail corresponding to the voice operation; and
- separates the plurality of processing details into a plurality of groups, wherein
the circuitry outputs the response information for the user to make a selection from among the plurality of groups, and selects a method for separating the plurality of processing details into the plurality of groups based on an expectation value indicating the number of the plurality of processing details predicted to remain after the selection from among the plurality of groups is made.

2. The information processing device according to claim 1, wherein
the circuitry obtains the expectation value based on a weight coefficient indicating a possibility that each of the plurality of processing details corresponds to the voice operation.

3. The information processing device according to claim 1, wherein
the circuitry equally separates the plurality of processing details into the plurality of groups.

4. The information processing device according to claim 1, wherein
the circuitry separates the plurality of processing details into the plurality of groups on a category-by-category basis.

5. The information processing device according to claim 1, wherein
the circuitry separates the plurality of processing details into the plurality of groups based on a weight coefficient indicating a possibility that each of the plurality of processing details corresponds to the voice operation.

6. The information processing device according to claim 1, wherein
when the number of the plurality of processing details that are extracted is greater than an upper limit value, the circuitry separates the plurality of processing details into the plurality of groups.

7. The information processing device according to claim 6, wherein
the upper limit value varies in a manner that depends on operation conditions of the information processing device.

8. The information processing device according to claim 1, wherein
the circuitry
- receives the voice operation corresponding to the plurality of processing details,
- extracts the plurality of processing details corresponding to the voice operation, and
- outputs the response information containing screen information for the user to make a selection of the processing detail from among the plurality of processing details that are extracted.

9. The information processing device according to claim 8, wherein
the response information contains the screen information representing a method for selecting the processing detail from among the plurality of processing details.

10. The information processing device according to claim 8, wherein
the response information contains the screen information representing a phrase that makes each of the plurality of processing details specifiable.

11. An information processing device comprising:
circuitry that
- receives a voice operation of a user;
- extracts a processing detail corresponding to the voice operation that is received;
- outputs response information containing a plurality of processing details that are extracted as corresponding to the voice operation, for the user to make a selection of at least one processing detail from the plurality of processing details, under a condition that the processing detail corresponding to the voice operation cannot be specified; and
- specifies the processing detail selected from among the plurality of processing details contained in the response information as the processing detail corresponding to the voice operation, wherein under a condition that the number of the plurality of processing details that are extracted is equal to or greater than a threshold, the circuitry outputs the response information for the user to make a selection of a category of the processing detail.

12. An information processing device comprising:
circuitry that
receives a voice operation of a user,
extracts a processing detail corresponding to the voice operation that is received;
outputs response information containing a plurality of processing details that are extracted as corresponding to the voice operation for the user to make a selection of at least one processing detail from the plurality of processing details, under a condition that the processing detail corresponding to the voice operation cannot be specified; and
specifies the processing detail selected from among the plurality of processing details contained in the response information as the processing detail corresponding to the voice operation, wherein
under a condition that the number of applications configured to execute the plurality of processing details that are extracted is equal to or greater than a threshold, the circuitry outputs the response information for the user to make a selection from the applications.

13. The information processing device according to claim 12, wherein
under a condition that the number of the plurality of processing details that are extracted is equal to or greater than a threshold, the circuitry outputs the response information for the user to make a selection of the processing detail from among the plurality of processing details corresponding to the voice operation previously received.

14. The information processing device according to claim 12, wherein
the circuitry outputs the response information containing screen information for causing the plurality of processing details that are extracted to be alternately displayed every fixed period.

15. The information processing device according to claim 12, wherein
under a condition that the voice operation indicates specific wording associated with a first processing detail, the circuitry
extracts the first processing detail associated with the specific wording and a second processing detail inferred based on a meaning of the specific wording in an initial state where the specific wording is not associated with the first processing detail, and
outputs the response information for the user to make a selection of one of the first processing detail associated with the specific wording indicated by the voice operation and the second processing detail inferred based on the meaning of the specific wording in the initial state where the voice operation is not associated with the first processing detail.

16. The information processing device according to claim 12, wherein
the circuitry extracts a processing execution instruction and an entry of a character string of the voice operation as the plurality of processing details corresponding to the voice operation, and outputs the response information for the user to make a selection of one of the processing execution instruction and the entry of the character string as the processing detail corresponding to the voice operation.

* * * * *